US007072976B2

(12) United States Patent  
Lee

(10) Patent No.: US 7,072,976 B2  
(45) Date of Patent: Jul. 4, 2006

(54) SCALABLE ROUTING SCHEME FOR A MULTI-PATH INTERCONNECTION FABRIC

(75) Inventor: Whay S. Lee, Newark, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 887 days.

(21) Appl. No.: 09/755,479

(22) Filed: Jan. 4, 2001

(65) Prior Publication Data

US 2002/0147841 A1 Oct. 10, 2002

(51) Int. Cl.  
*G06F 15/173* (2006.01)

(52) U.S. Cl. .................... 709/238; 709/243; 710/1; 710/31; 710/33; 710/34; 710/38; 370/351

(58) Field of Classification Search ............... 709/238, 709/243; 710/1, 31, 33, 34, 38  
See application file for complete search history.

(56) References Cited

U.S. PATENT DOCUMENTS

| | | | | |
|---|---|---|---|---|
| 4,862,496 A | * | 8/1989 | Kelly et al. | 379/221.01 |
| 4,980,822 A | * | 12/1990 | Brantley et al. | 711/202 |
| 5,088,032 A | * | 2/1992 | Bosack | 709/242 |
| 5,101,480 A | * | 3/1992 | Shin et al. | 710/317 |
| 5,105,424 A | * | 4/1992 | Flaig et al. | 709/243 |
| 5,115,495 A | * | 5/1992 | Tsuchiya et al. | 709/239 |
| 5,175,733 A | * | 12/1992 | Nugent | 370/400 |
| 5,181,017 A | * | 1/1993 | Frey et al. | 709/239 |
| 5,187,671 A | * | 2/1993 | Cobb | 716/12 |
| 5,583,990 A | | 12/1996 | Birrittella et al. | |
| 5,602,839 A | * | 2/1997 | Annapareddy et al. | 370/405 |
| 5,612,897 A | | 3/1997 | Rege | |
| 5,613,069 A | * | 3/1997 | Walker | 709/238 |
| 5,625,836 A | | 4/1997 | Barker et al. | |
| 5,627,990 A | | 5/1997 | Cord et al. | |
| 5,646,936 A | | 7/1997 | Shah et al. | |
| 5,671,356 A | | 9/1997 | Wang | |
| 5,682,479 A | | 10/1997 | Newhall et al. | |
| 5,689,646 A | | 11/1997 | Thorson | |

(Continued)

FOREIGN PATENT DOCUMENTS

DE 199 23 245 5/1999

(Continued)

OTHER PUBLICATIONS

G. Albertengo, et al., "Optimal Routing Algorithms for Bidirectional Manhattan Street Network," IEEE, 1991, 3 pages.

(Continued)

*Primary Examiner*—Saleh Najjar  
*Assistant Examiner*—Michael Y. Won  
(74) *Attorney, Agent, or Firm*—Robert C. Kowert; Meyertons, Hood, Kivlin, Kowert & Goetzel, P.C.

(57) ABSTRACT

Various embodiments of a scalable routing system for use in an interconnection fabric are disclosed. In this routing scheme, a routing directive describes a route in the interconnection fabric between a sending node and a destination node. Either the sending node or a sending device connected to the sending node encodes the routing directive in a message to be sent to the destination node. The routing directive may include a variable number of segments. Each segment includes a distance component and a direction component that tell each node along the route how it should send the message. Generally, each distance component describes a distance in the interconnection fabric while each direction component specifies a direction in the interconnection fabric.

62 Claims, 18 Drawing Sheets

U.S. PATENT DOCUMENTS

| | | | |
|---|---|---|---|
| 5,689,661 | A | 11/1997 | Hayashi et al. |
| 5,701,416 | A * | 12/1997 | Thorson et al. ............... 712/11 |
| 5,720,025 | A | 2/1998 | Wilkes et al. |
| 5,729,756 | A | 3/1998 | Hayashi |
| 5,737,628 | A | 4/1998 | Birrittella et al. |
| 5,764,641 | A | 6/1998 | Lin |
| 5,781,534 | A * | 7/1998 | Perlman et al. ............. 370/248 |
| 5,862,312 | A | 1/1999 | Mann et al. |
| 5,912,893 | A | 6/1999 | Rolfe et al. |
| 5,970,232 | A | 10/1999 | Passint et al. |
| 6,016,510 | A | 1/2000 | Quattromani et al. |
| 6,023,753 | A | 2/2000 | Pechanek et al. |
| 6,049,527 | A | 4/2000 | Isoyama et al. |
| 6,055,618 | A | 4/2000 | Thorson |
| 6,072,774 | A * | 6/2000 | Natarajan et al. ........... 370/231 |
| 6,101,181 | A | 8/2000 | Passint et al. |
| 6,128,277 | A | 10/2000 | Bruck et al. |
| 6,145,028 | A | 11/2000 | Shank et al. |
| 6,151,299 | A | 11/2000 | Lyon et al. |
| 6,157,962 | A | 12/2000 | Hodges et al. |
| 6,167,502 | A | 12/2000 | Pechanek et al. |
| 6,330,435 | B1 | 12/2001 | Lazaraq et al. |
| 6,338,129 | B1 | 1/2002 | Pechanek et al. |
| 6,370,145 | B1 | 4/2002 | Dally et al. |
| 6,405,185 | B1 | 6/2002 | Pechanek et al. |
| 6,434,637 | B1 | 8/2002 | DErrico |
| 6,567,378 | B1 | 5/2003 | Yuan et al. |
| 6,658,478 | B1 | 12/2003 | Singhal et al. |
| 6,718,428 | B1 | 4/2004 | Lee et al. |
| 6,741,561 | B1 | 5/2004 | Lee |
| 6,792,472 | B1 * | 9/2004 | Otterness et al. ........... 709/239 |
| 2002/0065962 | A1 | 5/2002 | Bakke et al. |
| 2002/0141345 | A1 | 10/2002 | Szviatovszki et al. |
| 2003/0048771 | A1 | 3/2003 | Shipman |

FOREIGN PATENT DOCUMENTS

| | | |
|---|---|---|
| EP | 439 693 | 8/1991 |
| EP | 550 853 | 12/1992 |
| EP | 646 858 | 8/1994 |
| EP | 669 584 | 2/1995 |
| EP | 0 785 512 | 7/1997 |
| WO | 92/06436 | 4/1992 |
| WO | 94/12939 | 6/1994 |
| WO | 99/17217 | 4/1999 |
| WO | 99/26429 | 5/1999 |
| WO | 99/63442 | 12/1999 |
| WO | 00/14932 | 3/2000 |

OTHER PUBLICATIONS

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874-902.

Reddy, Dept. of Computer & Information Sciences, "A Dynamically Reconfigurable WDM LAN Based on Reconfigurable Circulant Graph," IEEE. 1996, 4 pages.

Various Abstracts beginning with Funahashi, Jouraku and Amano, "Adaptive Routing for Recursive Diagonal Torus," Transactions of the Institute of Electronics, Information and Communication Engineers D-I, vol. J83D-I, No. 11, Nov. 2000, pp. 1143-1153.

Milan Kovacevic, Center for Telecommunications Research, "On Torus Topologies with Random Extra Links," IEEE 1996, pp. 410-418.

Dally, et al., The Torus Routing Chip, Distributed Computing, Springer-Verlag 1986, pp. 187-196.

Susan Hinrichs, "A Compile Time Model for Composing Parallel Programs," IEEE Parallel and Distributed Technology, 1995, 19 pages.

"CRAY T3D System Architecture Overview Manual," ftp://ftp.cray.com/product-info/mpp/T3D_Architecture_Over/T3D.overview.html, Cray Research, 1993, 40 pages.

Marco Fillo, et al., "The M-Machine Multicomputer," Laboratory for Computer Science, Massachusetts Institute of Technology, A.I. Memo No. 1532, Ann Arbor,. Mar. 1995, 14 pages.

Noakes, et al., "The J-Machine Multicomputer: An Architectural Evaluation," Proceedings of the 20$^{th}$International Symposium on Computer Architecture, May 1993, 12 pages.

Dally, et al., "Architecture of a Message-Driven Processor," International Conference on Computer Architecture, Jun. 1987, pp. 189-196.

Dennison, Lee and Dally, "High-Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al. "The Reliable Router: A Reliable and High-Performance Communication Substrate for Parallel Computers," Proceedings of the First International Parallel Computer Routing and Communication Workshop, Seattle WA, May 1994, 15 pages.

Dennison, et al., "Low-Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science, Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufmann Publishers, 1992, pp. 1-831.

Christopher J. Glass and Lionel Ni, "Fault-Tolerant Wormhole Routing in Meshes," Technical Report, MSU-CPS-ACS-72, Oct. 30, 1992 (revised May 25, 1993), 28 pages.

Stefan Savage and John Wilkes, "AFRAID-A Frequently Redundant Array of Independent Disks," Proceedings of the 1996 USENIX Technical Conference, pp. 27-39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU-CPS-ACS-44, Oct. 10, 1991 (revised Mar. 2, 1992), pp. 278-287 (numbered herein as 1-20).

Thomas Stricker, "Message Routing on Irregular 2D-Meshes and Tori," School of Computer Science, Carnegie Mellon Univ., Jan. 15, 1991, pp. 170-177 (numbered herein as 1-19).

Dally, et al., "The J-Machine: A Restrospective," in 25 Years of the International Symposia on Computer Architecture—Selected Papers. pp. 54-58.

"A Routing Protocol for Finding Two Node-Disjoint Paths in Computer Networks," Ishida, et al., IEEE, 1995, pp. 340-347.

Cisco Systems Glossary Tool, Routing Table: Technical Definition, 1999-2002, Cisco Systems,.

\* cited by examiner

400

SCALABLE ROUTING SCHEME FOR A MULTI-PATH INTERCONNECTION FABRIC

BACKGROUND OF THE INVENTION

1. Field of the Invention

This invention relates generally to the field of computer systems and, more particularly, to communications protocols within computer systems and/or networks, and communication routing or switching within interconnection fabrics.

2. Description of the Related Art

Computer systems are placing an ever-increasing demand on data storage systems. In many of the data storage systems in use today, data storage arrays are used. The interconnection solutions for many large storage arrays are based on bus architectures such as small computer system interconnect (SCSI) or fibre channel (FC). In these architectures, multiple storage devices such as disks may share a single set of wires, or a loop in the case of FC, for data transfers.

Such architectures may be limited in terms of performance and fault tolerance. Since all the devices share a common set of wires, only one data transfer may take place at any given time, regardless of whether or not all the devices have data ready for transfer. Also, if a storage device fails, it may be possible for that device to render the remaining devices inaccessible by corrupting the bus. Additionally, in systems that use a single controller on each bus, a controller failure may leave all the devices on its bus inaccessible.

There are several existing solutions available, which are briefly described below. One solution is to divide the devices into multiple subsets utilizing multiple independent buses for added performance. Another solution suggests connecting dual buses and controllers to each device to provide path fail-over capability, as in a dual loop FC architecture. An additional solution may have multiple controllers connected to each bus, thus providing a controller fail-over mechanism.

In a large storage array, component failures may be expected to be fairly frequent. Because of the higher number of components in a system, the probability that a component will fail at any given time is higher, and accordingly, the mean time between failures (MTBF) for the system is lower. However, the above conventional solutions may not be adequate for such a system. In the first solution described above, the independent buses may ease the bandwidth constraint to some degree, but the devices on each bus may still be vulnerable to a single controller failure or a bus failure. In the second solution, a single malfunctioning device may still potentially render all of the buses connected to it, and possibly the rest of the system, inaccessible. This same failure mechanism may also affect the third solution, since the presence of two controllers does not prevent the case where a single device failure may force the bus to some random state.

Devices in a network or fabric need to be able to communicate with one another. For example, one device may need to send a message to another device corresponding to an operation that first device seeks to perform with the other device's assistance. Communications between devices in an interconnection fabric can be enabled by encoding directions within the messages on how they should be routed through the fabric. For example, a message can be sent along a route in an interconnection fabric comprising several nodes by encoding the route as a list of the node identifiers. The node identifiers uniquely identify each node in the interconnection fabric. For example, the node identifiers might specify coordinates that locate a node in the interconnection fabric. The encoded route might list the node identifiers of each node the message needs to pass through to reach its destination. Another method, used to send messages when nodes in the fabric are capable of being described by coordinates, implicitly specifies the route by providing the coordinates of the sending and receiving nodes. This method allows routes to be calculated from the difference between the two coordinates.

Alternately, the only routing information encoded in the message might be the node identifier of the destination node. The route could then be chosen on the fly. For example, this on-the-fly route might be created by making random turns. Each turn might be made so that the message is brought closer to the destination node. This method provides more flexibility to circumvent faults in the interconnection fabric than some methods, but it may also require more complicated routing circuitry. Yet another method of sending messages involves simply sending the message to all the nodes or devices in the interconnection fabric. This is done by having each node transmit the message to all the nodes it is connected to except the ones from which it received the message. Each node then tries to match its own identifier to that of the destination node encoded in the message.

While all of these methods effectively transmit messages, the use of node identifiers necessarily limits the scalability of the fabric. For example, using 4-bit node identifiers confines the fabric to a maximum size of 16 nodes. If the interconnection fabric exceeds this size, the size of the node identifiers will have to be increased. Identifier size can also limit the shape of the fabric. For example, if a 4-bit identifier contained two 2-bit fields corresponding to the x, y coordinates of each node in a mesh, the mesh could measure 4×4 nodes but could not measure 8×2 nodes, even though both shapes contain 16 nodes, because the latter shape could not be described with 2-bit identifiers.

Another problem with existing routing methods is that they have a limited ability to describe alternate paths between nodes or devices. If independent paths are available between devices or nodes in a network or interconnection fabric, communications are more robust because all of the independent paths must develop errors before communications between the devices or nodes are disrupted. Thus it is desirable to have a routing system capable of using all available independent paths so that communications are less susceptible to errors.

A routing system that lists the identifier of each node along the route can identify all independent paths, but this system still has scalability limitations mentioned above. Encoding schemes that require calculation may be designed to only calculate paths in certain ways, such as by subtracting a sender coordinate from a destination coordinate. In a scheme like this, the calculation may also be unable to identify all of the available independent routes. Similarly, routing systems that calculate routes on the fly by always turning in a certain direction will not be able to identify independent paths that require turning in a different direction. In these situations, the benefit of having multiple independent paths is lost.

SUMMARY

Various embodiments of a routing system are disclosed. In one embodiment, an interconnection fabric connects a plurality of nodes together. Each node has a plurality of input and output ports. One embodiment may include a method for sending a message in an interconnection fabric from a sending node to a destination node. The method identifies a route in the interconnection fabric from the sending node to the destination node. A routing directive describing this route is encoded in the message. The routing directive might be stored in a routing table. The routing directive might be encoded in the message by the sending device or the sending node. The routing directive is made up of a variable number of segments, where each segment has a distance component and a direction component. The message is sent on one of the sending node's output ports to one of the input ports of another node. The distance component of the current segment of the routing directive is decremented to reflect that one hop along the route was made. One of the output ports of the first node is selected according to the current segment of the routing directive, and the message is sent on the selected output port.

In some embodiments, the output port of the first node is selected by checking to see if the distance component of the current segment is greater than zero. If so, an output port is selected that corresponds to the direction the message was traveling in when the first node received it. If the distance component of the current segment equals zero, an output port is selected according to the value of the direction component of the current segment. The direction component might expressly identify which port the node should select. In other embodiments, the direction component might specify a direction relative to that in which the message was traveling when it was received, and the node would select an output port accordingly. The direction component might also identify the node as the destination node and indicate that it should send the message on a device port that is connected to a device. In some embodiments, the current segment of the routing directive is removed if it is complete.

Some embodiments involve a return routing directive that describes a route from the destination node to the source node. The return routing directive may be identified along with the routing directive. The return routing directive might be included in a routing table. In certain embodiments, the return routing directive might be calculated from the routing directive. For example, the return routing directive could be the reverse of the routing directive. Other embodiments create the return route incrementally. Each node might add information to the return routing directive as the message passes through that node.

Another embodiment describes a node configured to send messages using a scalable routing system. The node is made up of a routing unit and a plurality of input and output ports. In some embodiments, if the node is the sending node, the routing unit may be configured to identify a route for sending a message to a destination node and to encode a routing directive describing that route in the message. In some embodiments, the node is configured to decrement the distance component of the current segment and to select an output port based on the value of the current segment. In one embodiment, when the node is the destination node, it is configured to communicate the message on a device port to a device. In some embodiments, the node may remove the current segment if it is complete. The node may also be configured to add to a return routing directive.

In yet another embodiment, a device is configured to communicate with a node in an interconnection fabric. The interconnection fabric comprises a plurality of routes between the node and a destination node. The device is configured to identify a first routing directive describing a route from the node to the destination node. The routing directive comprises at least one segment, and the segment comprises a distance component and a direction component. The device is configured to send a message to a second device configured to communicate with the destination node. The device is configured to encode the first routing directive in the message and to communicate the message to the node. As the message is being routed through the interconnection fabric to the destination node, a receiving node in the interconnection fabric is configured to receive the message and to decrement the distance component of one of the segments in the routing directive.

The device may also be configured to communicate with a controller such as a RAID controller, or to communicate with a host interface or line card. In some embodiments, the device may also be configured to encode a return routing directive in the message. In other embodiments, a return routing directive may be encoded in the message incrementally. For example, the node that receives the message as it is routed to the destination node may be configured to incrementally encode a portion of the return routing directive in the message. If the message fails to be sent to the destination node, the receiving node may use the incrementally created return routing directive to return an error message to the sender. The device may in turn be configured to use the incrementally created return routing directive to locate an error in the interconnection fabric.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In accordance with the present invention, one embodiment includes a routing scheme for use when sending messages between a sending node to a destination node in an interconnection fabric. Each node in the fabric may have one or more ports connecting it with neighboring nodes. In addition to the ports that connect each node to its neighboring node(s), each node may also have one or more ports that connect the node to a device. A device might be a computer system, a host interface to a storage system, a disk drive, or any combination of networked devices, such as client computers, servers, storage devices, etc.

In this routing scheme, a routing directive describes the route the message should take between the sending node and the destination node. Either the sending node or the sending device connected to the sending node may encode the routing directive in the message. The routing directive may include a variable number of segments. Each segment might include a distance component and a direction component that tell each node along the route how it should send the message. Generally, each distance component describes a distance in the interconnection fabric while each direction component specifies a direction in the interconnection fabric.

The sending node or the sending device may maintain a routing table that contains the different routing directives to use when sending messages to various destination nodes. When sending a message, the node or device might select the appropriate routing directive from the routing table and then encode it in the message. If the interconnection fabric contains multiple independent paths, the routing table may contain additional routing directive entries describing the other independent paths to each destination node.

Figure 1:
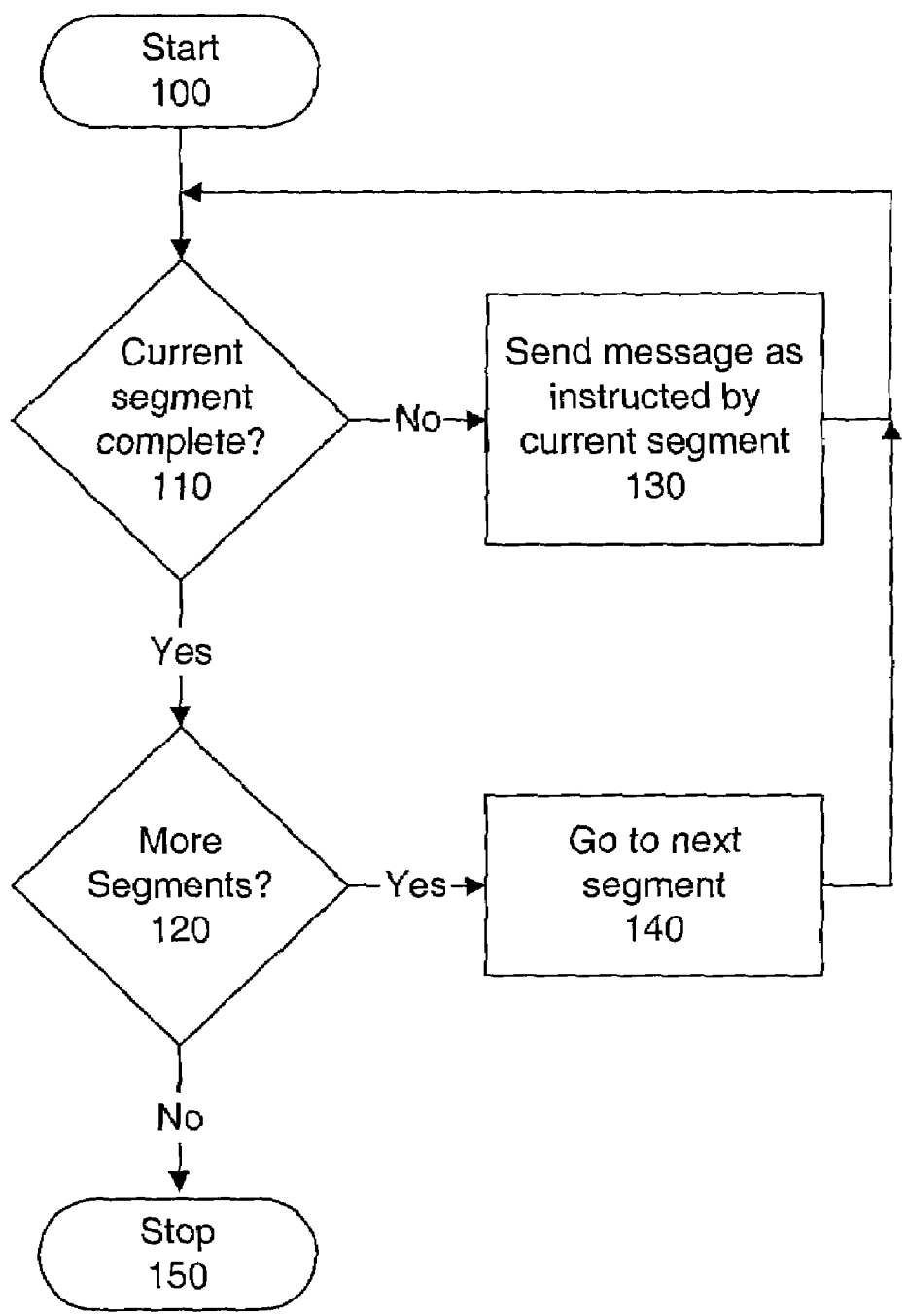
FIG. 1 is a flowchart showing how routing directives can be used to send messages in an interconnection fabric.

Turning to FIG. 1, a flowchart describes a process for sending a message through an interconnection fabric according to one embodiment of the present invention. A routing directive is encoded within the message. This routing directive may include a variable number of segments describing the route in the interconnection fabric. When a node receives the message, it looks to the routing directive for instructions on how to send the message. In step 110, the node looks at the current segment. If the current segment is not yet completely executed, the node passes the message to the next node according to that segment's instructions. If the current segment is complete, the node looks to the next segment of the routing directive for instructions. As the message is routed through the node, the node may decrement (decrease decrementally) the distance component of the current segment to reflect how much of the routing directive has been executed. Once all of the instructions in all of the segments have been followed, the process is complete and the message has completed the route.

Since this routing scheme does not depend on node identifiers, the size of the interconnection fabric may be changed without requiring modification to the routing circuitry that implements the routing scheme. Instead, as the fabric changes, updated routing directives that work with the same routing circuitry may be stored in the appropriate routing tables in the sending nodes or sending devices. In larger interconnection fabrics, longer routes may be formed by using more segments. If a particular number of hops is too large to be represented by a single segment, several additional segments might be combined to provided the total needed distance. For example, if only 3 bits are available for each distance component, a distance of 20 hops might be encoded in 3 segments. Routing circuitry might also be simplified because the nodes do not need information about the overall size or shape of the interconnect fabric in order to send messages.

The following figures illustrate various interconnection fabrics and nodes within interconnection fabrics that might use this routing scheme. While the invention is explained by reference to specific interconnection fabrics, it should be readily apparent to one skilled in the art that embodiments of the present invention could be implemented in any point-to-point interconnection fabric or topology.

Figure 2:
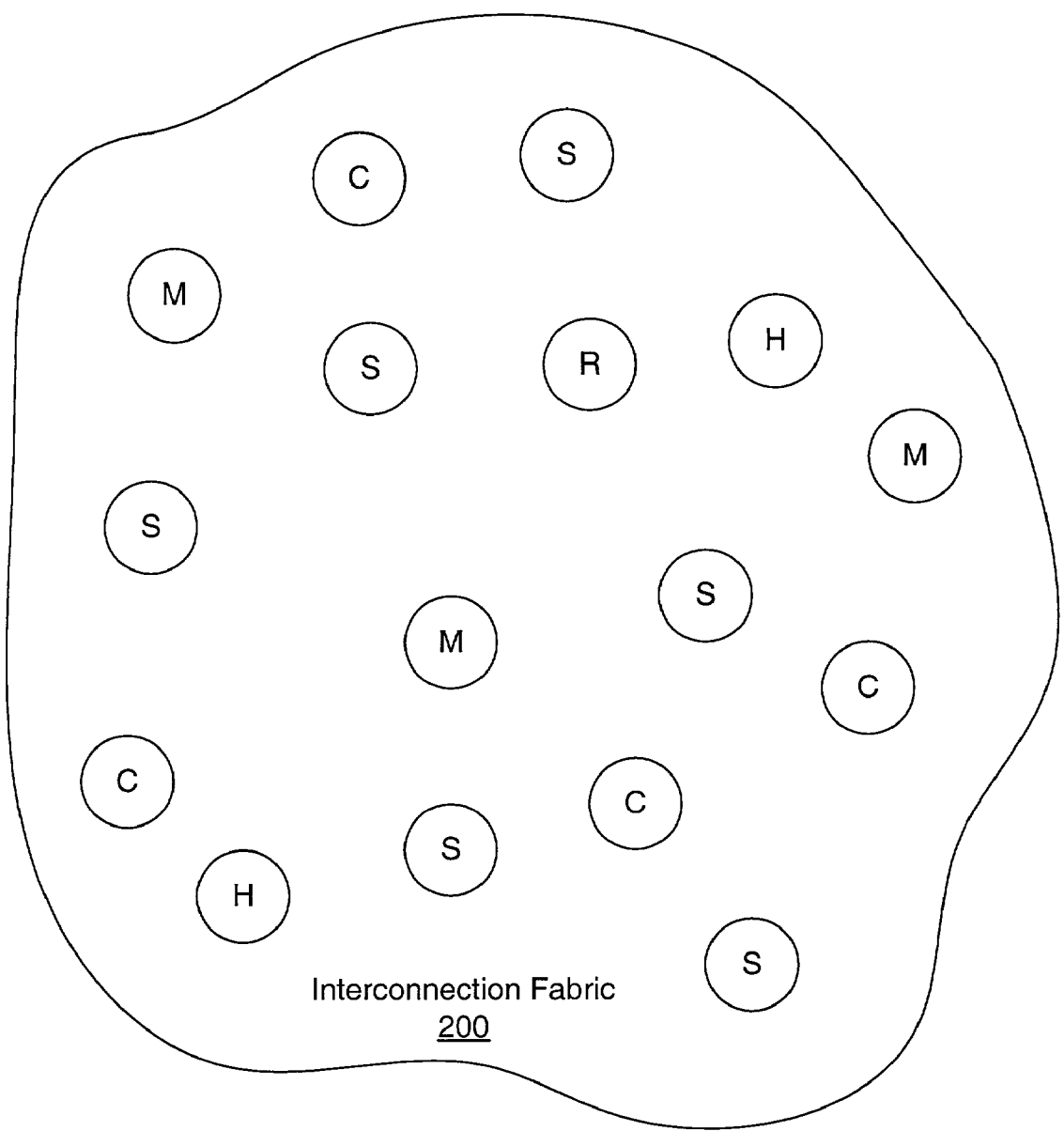
FIG. 2 is a diagram of one embodiment of an interconnection fabric using multiple independent paths.

Turning now to FIG. 2, a diagram of one embodiment of an interconnection fabric using multiple independent paths is shown. An interconnection fabric 200 is shown with several nodes. Each node may support one or more different types of devices in a storage system. The nodes are labeled with the letters C, H, M, R and S. A node with the letter C means the node may be configured to support a controller such as a Redundant Array of Inexpensive Disks (RAID) controller. A node with the letter H means the node may be configured with a host interface or line card that may serve as an interface to a host computer. A node with the letter R means the node may be configured as a routing node and merely expands the communication paths available between other nodes. A node with the letter S means the node may be configured as a mass storage node and may be connected to one or more mass storage devices such as hard disk drives. A node with the letter M means the node may be configured as a storage cache memory node that provides, for example, a hierarchical storage cache for one or more mass storage nodes. Also, nodes may support any combination of these features. It is noted that while the nodes are configured and labeled in the embodiment of FIG. 2, this is only an exemplary drawing. In other embodiments, there may be other configurations that have a fewer or greater number of nodes and the nodes may be configured and used differently. For example, there may be a fewer or greater number of S nodes and a fewer or greater number of H nodes.

Generally speaking, each node may be connected to each other node in the fabric by multiple communication paths (not shown in FIG. 2). The communication paths form the fabric such that each communication path may be completely independent of each other path. Therefore, each node may have multiple possible paths to use when communicating with another node. Multiple independent paths may allow a source node and a destination node to continue communicating with each other even if one or more communications paths or nodes between the source and destination nodes becomes inoperative. The interconnect fabric may be a point-to-point interconnect between each node, in which multiple independent paths exist between a source node and a destination node. In one embodiment, every node has multiple independent paths to communicate with every other node. The path independence of the fabric may allow a node or a path to fail or experience adverse conditions (e.g. congestion) without affecting any other node or path.

The figures that follow will describe an embodiment of a node of interconnection fabric 200 and some exemplary diagrams of possible forms that interconnection fabric 200 may take.

Figure 3:
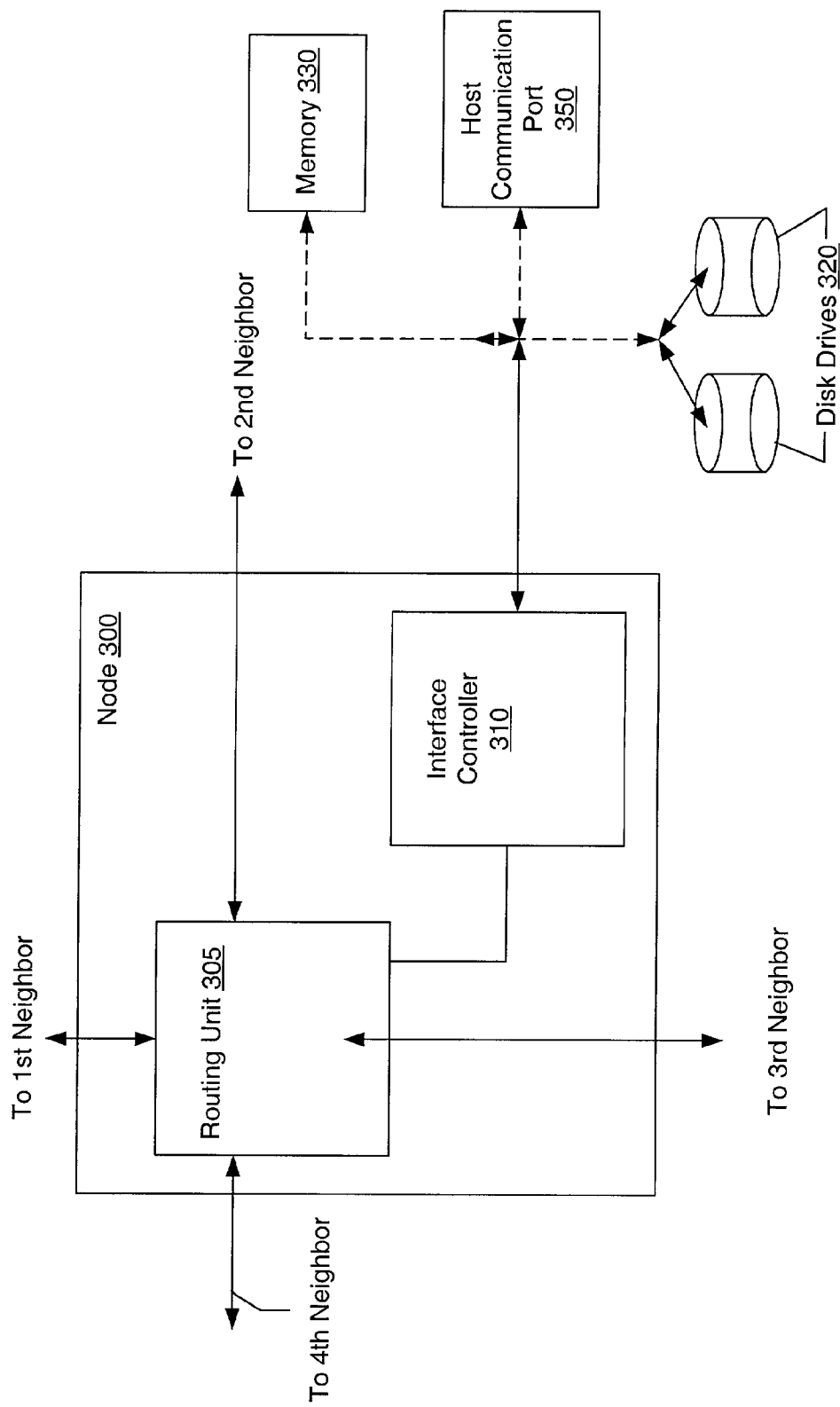
FIG. 3 is a block diagram a node of an interconnection fabric, according to one embodiment.

Turning now to FIG. 3, a block diagram of one embodiment of a node of the interconnection fabric of FIG. 2 is shown. In FIG. 3, a node 300 includes a routing unit 305 coupled to an interface controller 310. Routing unit 305 may be configured to communicate through multiple ports. In one particular embodiment, there may be four ports and the ports may be bi-directional. Thus, routing unit 305 may communicate with four neighboring nodes allowing four independent routing paths. In one alternative embodiment, routing unit 305 may be configured with four unidirectional ports: two inputs and two outputs. The choice between using bi-directional and unidirectional ports may be influenced by competing factors. The unidirectional design may be simpler, but it may only tolerate a single failure of a neighboring node. The bi-directional design tolerates more failures but may require a more complex routing unit 305. The size of the storage system array may be a determining factor, since for a very large number of storage devices, a three-fault tolerant bi-directional fabric may become desirable to attain a reasonably low MTBF.

In addition to the nodes communicating with other nodes, in one embodiment, interface controller 310 may be configured to communicate with one or more disk drives 320. In another embodiment, interface controller 310 may be configured to communicate with one or more random access memories 330, such as a hierarchical storage cache memory or other type of memory and a memory controller. In yet another embodiment, interface controller 310 may be configured to communicate with a host or a RAID controller through a communication port, such as a peripheral component interface (PCI) bus. It is also contemplated that interface controller 310 may have all of these functions or any combination of the above described functions. For example, interface controller 310 may be configurable for selecting between any one of the different types of interfaces described above. Thus, the ability to communicate with and/or control storage devices and communicate to hosts in an interconnection fabric may advantageously increase the reliability, performance and flexibility of large storage systems.

It is further contemplated that interface controller 310 may not have any devices attached. In such an embodiment, node 300 may simply connect to neighbors through routing port 305. Thus, node 300 may be used in the interconnection fabric of FIG. 2 to increase the number of possible communications paths available. Therefore, some nodes may be unpopulated with storage or other devices and used as routing nodes to increase the number of paths in the interconnection fabric. Although it is contemplated that the above described node embodiments may be used in the following figures when nodes are discussed, there may be other embodiments of the nodes which are modifications of the above described node embodiments.

Figure 4A:
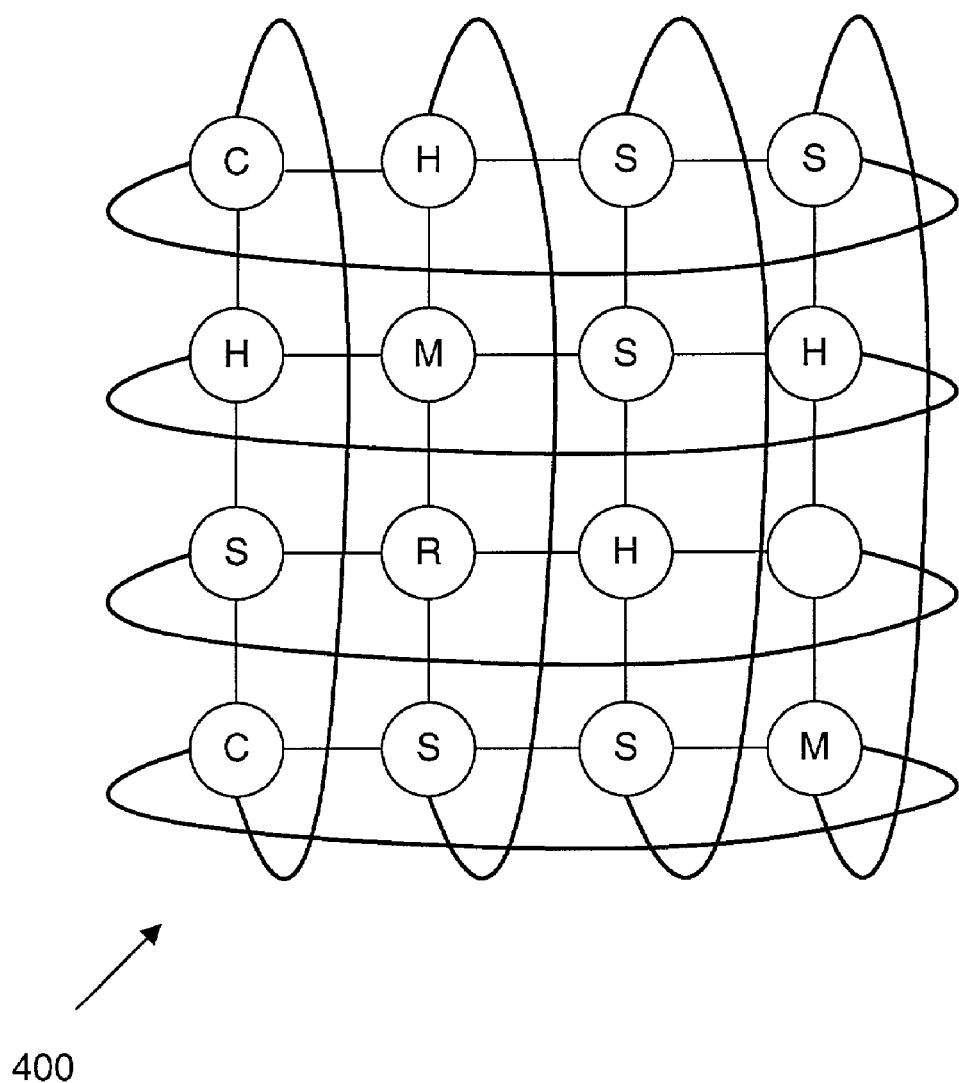
FIG. 4A is a diagram of one embodiment of a torus interconnection fabric.

Referring to FIG. 4A, a diagram of one embodiment of a torus interconnection fabric is shown. A torus fabric 400 may be employed as the interconnection fabric depicted in FIG. 2. In FIG. 4A, torus fabric 400 uses a two-dimensional (2-D) array topology with the beginning nodes of each row and column connected to the respective endpoints of each row and column. For example, if the 2-D array is an N by M array, where N and M are both positive integers, then the first node in row one would be connected to the last node in row one, in addition to all the other nodes neighboring the first node. Likewise, from a column perspective, the top node in column one is connected to the bottom node in column one in addition to all the other nodes neighboring the top node. The remaining nodes are connected in similar fashion such that every node in the fabric of torus 400 is connected to its four neighboring four nodes. It is noted that torus 400 is shown as a flat two-dimensional array with longer connections between the endpoints. These may be logical connections, and the physical layout of the nodes may be different. For example, each row may be physically oriented in the shape of a ring such that the distance from the last node to the first node may be nearly the same as the distance between all the other nodes and likewise for the columns.

The level of interconnection described above for a torus interconnect fabric means that in one embodiment each node may have four ports with which to communicate to the other nodes. In one embodiment, each of the four ports is a bi-directional port, thus allowing both inputs and outputs from each neighbor. In an alternative embodiment, each of the four ports is a uni-directional port, thus allowing two inputs and two outputs. Thus, torus 400 may provide an interconnection fabric with multiple independent paths for a storage device system.

Although the above torus 400 is described using a two-dimensional array, it is contemplated that this same fabric may be extended to include a multi-dimensional array beyond two dimensions (not shown). One embodiment of a three-dimensional array may include several two-dimensional arrays "stacked" or layered such that each node now has six neighboring nodes instead of four and each layer is connected together using the two additional ports.

In an additional embodiment, torus 400 may be reduced to a mesh (not shown). A mesh, like torus 400, may be logically arranged in either a 2-D or 3-D array. However a mesh does not have the wrap around connections connecting the row and column endpoints together that the torus has. Although the mesh does have multiple independent paths with which the nodes may communicate, not all the nodes have the same number of multiple independent paths.

Figure 4B:
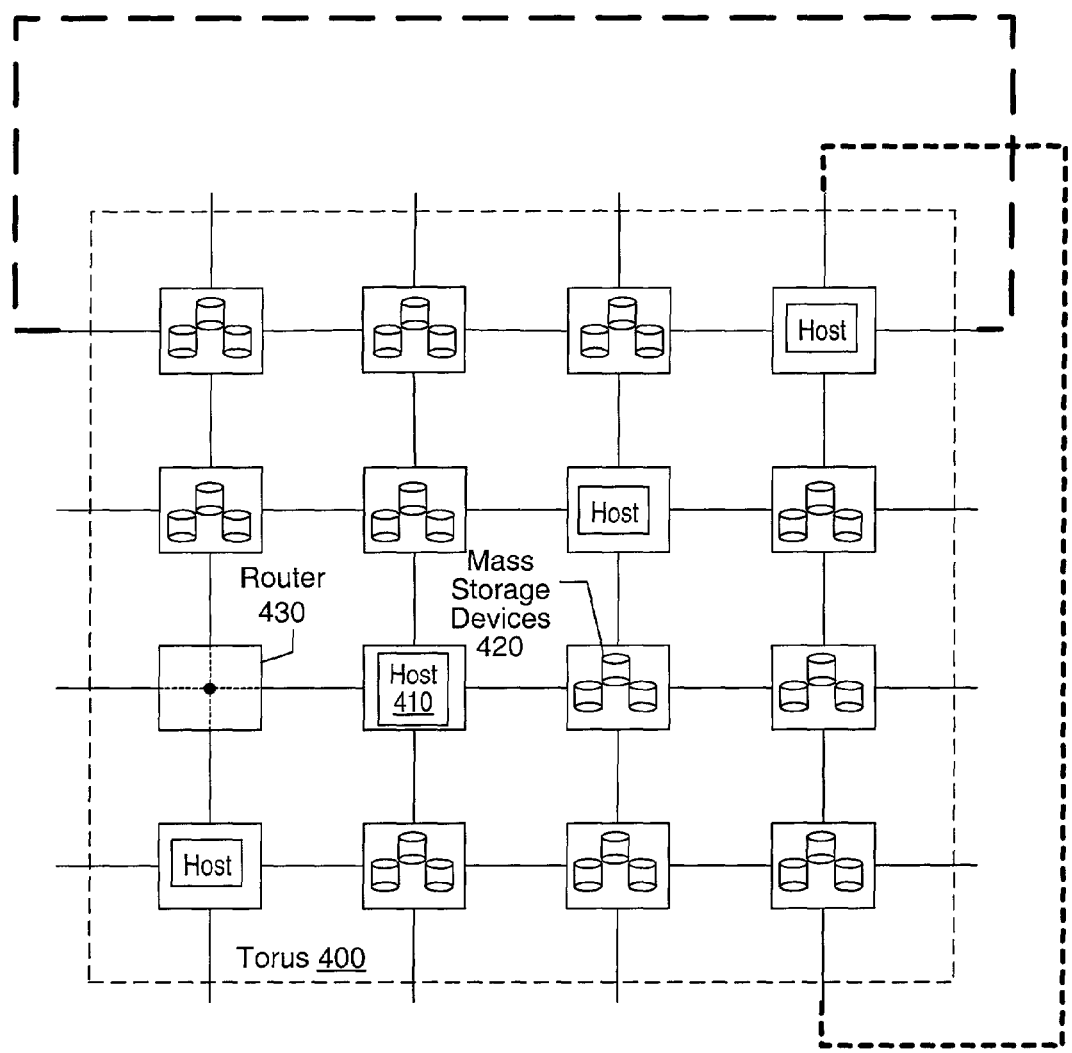
FIG. 4B is a diagram of one embodiment of a node configuration of a torus interconnection topology.

Referring now to FIG. 4B, a diagram of one embodiment of a node configuration of a torus interconnection topology is shown. The torus topology 400 of FIG. 4A is illustrated here with some of the interconnections not shown for clarity. In torus 400 of FIG. 4B, a portion of the nodes is shown comprising storage devices, such as storage devices 420. In one embodiment, storage devices 420 may be disk drives. Another portion of the nodes are shown with host blocks in them, such as host 410. Host 410 may be a host communication port or line card. Other nodes, such as router node 430, may include a routing unit to expand the interconnect paths but may not include a device such as a disk drive or host interface. Thus, a storage system may include a plurality of nodes connected together by an interconnect fabric such as a torus fabric. The interconnect fabric may provide multiple independent point-to-point communication paths between nodes sending communications and nodes receiving the communications. A portion of the nodes may include mass storage devices such as hard drives. Other nodes may include storage controllers or host interfaces. In general, a mass storage system may be provided by the plurality of nodes and interconnect paths. The multiple independent paths between nodes may provide fail-over redundancy and/or increased bandwidth for communications between source and destination nodes. As mentioned above, many large storage systems use a large number of disks. To reduce costs, inexpensive and smaller disks may be used. However, since more disks may increase the failure rate, a highly redundant interconnection fabric such as torus 400 may be used to provide a reliable overall system. For example, a storage controller node may send a write command and write data to a storage node having one or more hard drives. If the first path chosen for the write command fails, the command may be resent on a second path.

Additionally, the multiple paths of the torus interconnect allow for multiple parallel communications and/or disk operations that may be initiated over different paths, thereby possibly increasing the bandwidth and performance of the storage system. In a torus storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

It is noted that other embodiments may use fewer or more storage devices 420 and fewer or more host 410 nodes to facilitate cost and performance tradeoffs. In addition, and as mentioned above, it is contemplated that some nodes may be configured to communicate with RAID controllers, and/or storage cache memory.

The torus fabric is just one example of a multiple path independent interconnect that may provide improved reliability and performance, as described above. Other examples are described below.

Figure 5:
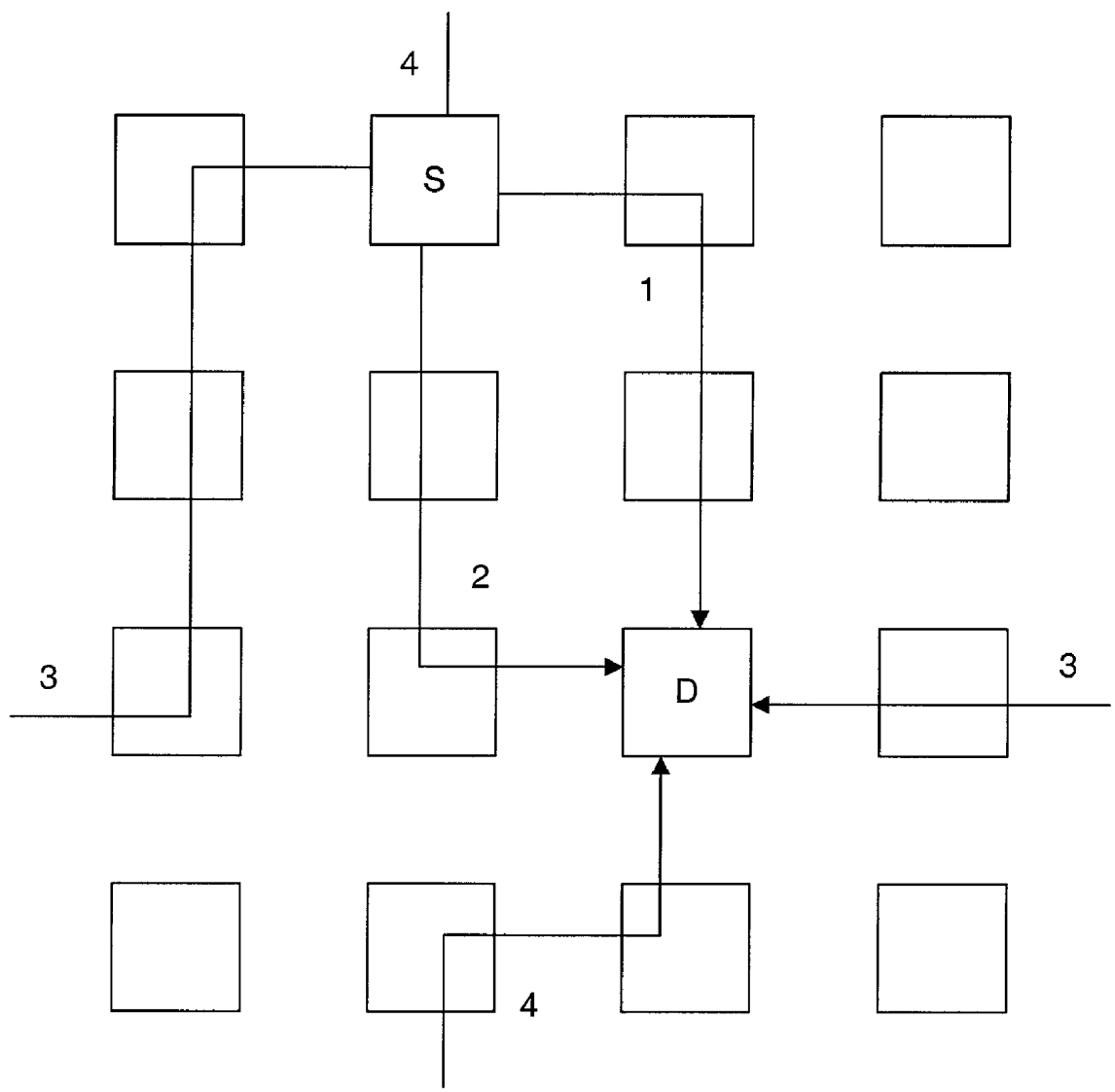
FIG. 5 is a diagram of independent paths in an interconnection fabric.

Turning now to FIG. 5 a plurality of nodes connected by an interconnection fabric using multiple independent paths is illustrated. In one embodiment, the nodes are connected by a torus fabric. FIG. 5 shows one possible combination of four independent paths from source node S to destination D. Many other combinations of such redundant paths are possible. Note that each path may traverse multiple intermediate nodes between the source and destination. Note also that various different multiple independent path interconnects may be employed besides a torus fabric.

Figure 6:
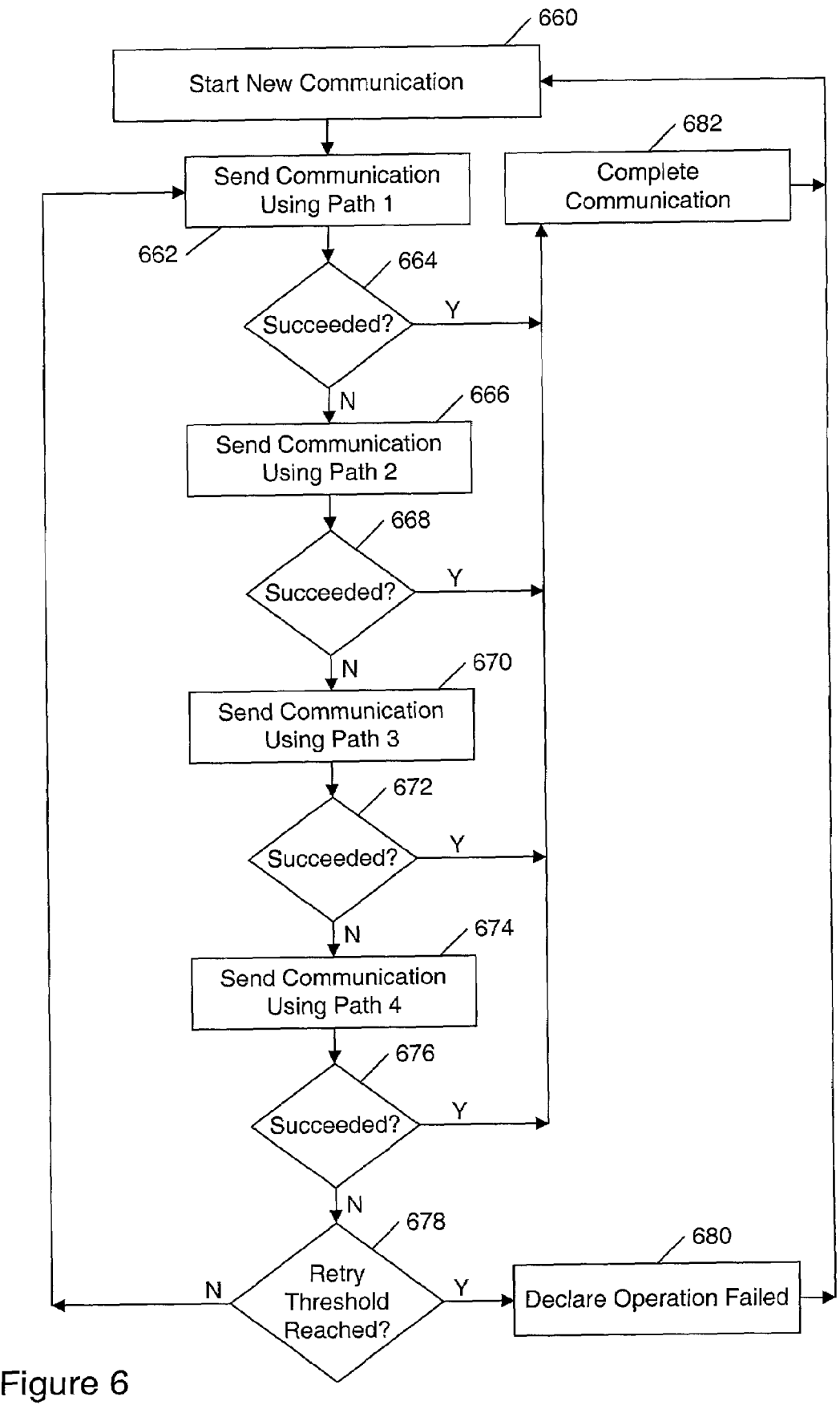
FIG. 6 is a flowchart of a method for routing communications between nodes in an interconnection fabric according to one embodiment.

Referring now to FIG. 5 and FIG. 6 together, a method is illustrated for routing communications within a multiple independent path interconnect fabric. A new communication may begin at source node S, as indicated at 660. To communicate with destination node D, source node S may attempt to use path 1, as indicated at 662. If the attempt succeeds, the communication event is completed, as indicated at 664 and 682. The attempt may fail due to various conditions in the path, including a failure in an intermediate node, congestion etc. If the attempt fails, the source node S may retry the communication through path 2, as indicated at 664 and 666. If that also fails, source node S may try path 3, as indicated at 668 and 670, and if that fails too, path 4 may be tried, as indicated at 672 and 674. After all of the paths have been tried without success, the source node S may optionally decide to return to path 1 and repeat the entire procedure again, as indicated at 678. In one embodiment, if the failure persists after some number of such repeated attempts, the source node may declare the destination node unreachable, and fail the operation completely, as indicated at 680.

Figure 7:
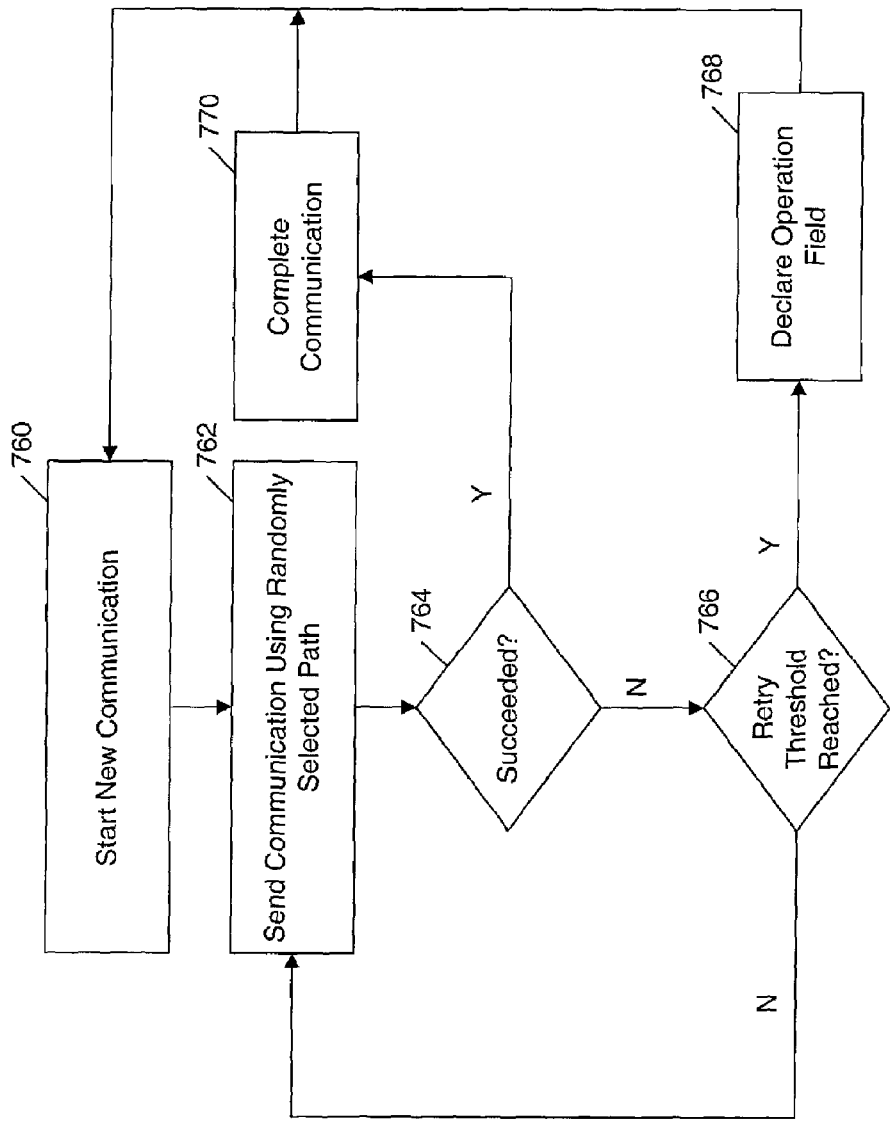
FIG. 7 is a flowchart of a method for routing communications between nodes in an interconnection fabric according to another embodiment.

FIG. 7 shows another approach for routing communications within a multiple independent path interconnect fabric. A communication may begin at source node S, as indicated at 760. Instead of sequentially trying path 1 through 4 (e.g., as in FIG. 6), the source node S may choose randomly from the possible paths 1 through 4, as indicated at 762. Source node S may retry until the operation is successful, as indicated at 764 and 770, or until the threshold is exceeded, upon which the destination is declared unreachable, as indicated at 766 and 768. Other path selection algorithms are also contemplated, such as a scheme in which paths are chosen by the source node according to a weighted preference assigned to each independent path from the source node to the destination node.

In the embodiments described in regard to FIG. 6 and FIG. 7, the intermediate nodes (e.g. those making up the path from S to D) may not make any decisions regarding what paths to try. In some embodiments, the intermediate nodes do not have complete knowledge of the path. For example, an intermediate node may only know that some message or communication came in from one of its input ports and requested to go out a specified one of its four output ports. The intermediate nodes may simply attempt to pass along the message or communication from the input port to the requested output port. If the attempt succeeds, the communication/message progresses to the next node until the message reaches its destination, upon which the message is delivered to the target device. Otherwise, the path may be considered bad or congested, etc. This condition may be signaled back to the source (e.g. with the cooperation of upstream intermediate nodes in the path). This path failure notification may prompt the source to select another path for the retry, e.g. according to the methods shown in FIG. 6 or FIG. 7, or other alternatives.

Figure 8A:
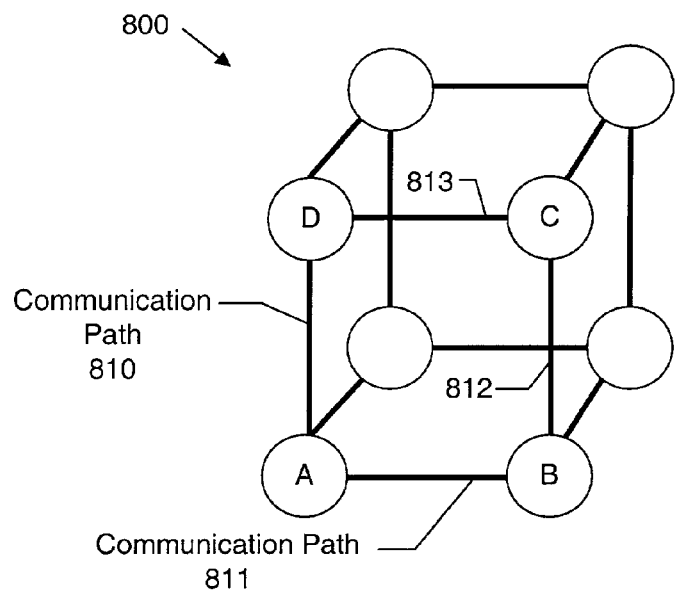
FIG. 8A is a diagram of one embodiment of a hypercube interconnection fabric.

Turning now to FIG. 8A, a diagram of one embodiment of a hypercube interconnection fabric is shown. A hypercube 800 may be employed as the interconnection fabric depicted in FIG. 2. In FIG. 8A, hypercube 800 has 8 nodes. Each node in hypercube 800 is connected to 3 neighboring nodes by three independent communications paths. Similar to the interconnection fabric shown in FIG. 2 and the torus interconnection fabric of FIGS. 4A and 4B, the nodes of hypercube 800 of FIG. 8A may also be configured to control or be connected to devices such as hard disks, cache memories, RAID controllers and host communications interfaces.

In general, a hypercube may be thought of as a structure with 2 to the power of n nodes. Hypercube 800 may be created, for example, by starting with a rectangle containing four nodes (e.g. a $2^2$ hypercube). To expand the structure, the 4 nodes are duplicated and connected to the existing 4 nodes forming hypercube 800, which is a $2^3$ hypercube. The nodes in the duplicated structure are connected to the nodes in the existing structure that are in the same location in the structure. Additionally, the value of the exponent 'n' may also identify the number of independent paths connected to each node.

Thus, if a node or communication path fails, another path may be used to communicate. For example, node A of FIG. 8A is communicating with node D via a communication path 810. In the event that communication path 810 is detected as a failing path, an alternate path may be used. For example, the communication may be rerouted through the path including communication path 811, node B, communication path 812, node C and communication path 813.

Figure 8B:
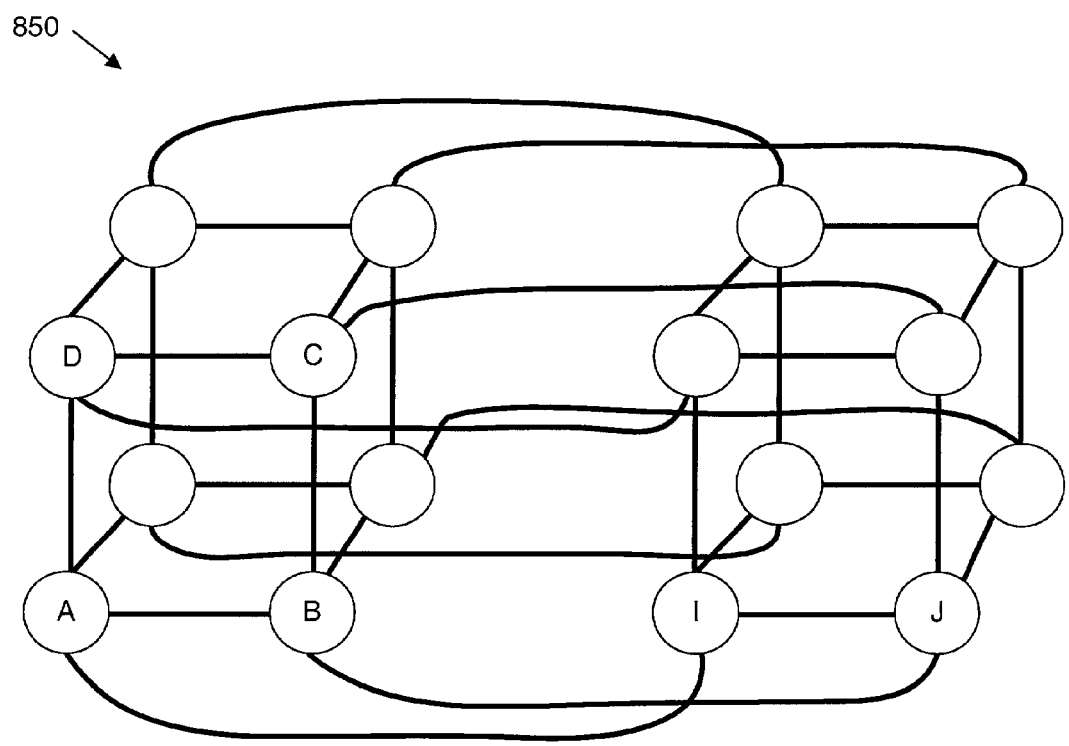
FIG. 8B is a diagram of another embodiment of a hypercube interconnection fabric.

Referring to FIG. 8B, a diagram of another embodiment of a hypercube interconnection fabric is shown. A hypercube 850 may be employed as the interconnection fabric depicted in FIG. 2. In FIG. 8B, hypercube 850 has 16 nodes. Hypercube 850 is an example of a $2^4$ hypercube. Each node in hypercube 850 is connected to 4 neighboring nodes by 4 independent communications paths. Thus hypercube 850 is also an interconnection fabric with multiple independent communication paths. Similar to the hypercube described in FIG. 8A, the nodes of hypercube 850 of FIG. 8B may also be configured to control or be connected to devices such as hard disks, cache memories, RAID controllers and host communications interfaces.

Hypercube 850 may be constructed by duplicating the $2^3$ hypercube in FIG. 8A. Each node in the original structure is connected to each node in the duplicated structure that is in the same location in the hypercube. For example, node A in FIG. 8B is connected to node I and node B is connected to node J and so on for the remaining nodes.

Additionally, the multiple paths of hypercube 800 of FIG. 8A and hypercube 850 of FIG. 8B may allow for multiple parallel communications and/or disk operations that may be initiated over different paths, thereby possibly increasing the bandwidth and performance of the storage system. In a hypercube storage system with multiple controllers/host attachments, many parallel paths may exist between the hosts and the disks. Thus, many disk operations may be issued at the same time and many data transfers may take place concurrently over the independent paths. This concurrency may provide a performance advantage and more scalability over bus-based architectures in which multiple devices must take turns using the same wires/fibre.

Figure 9:
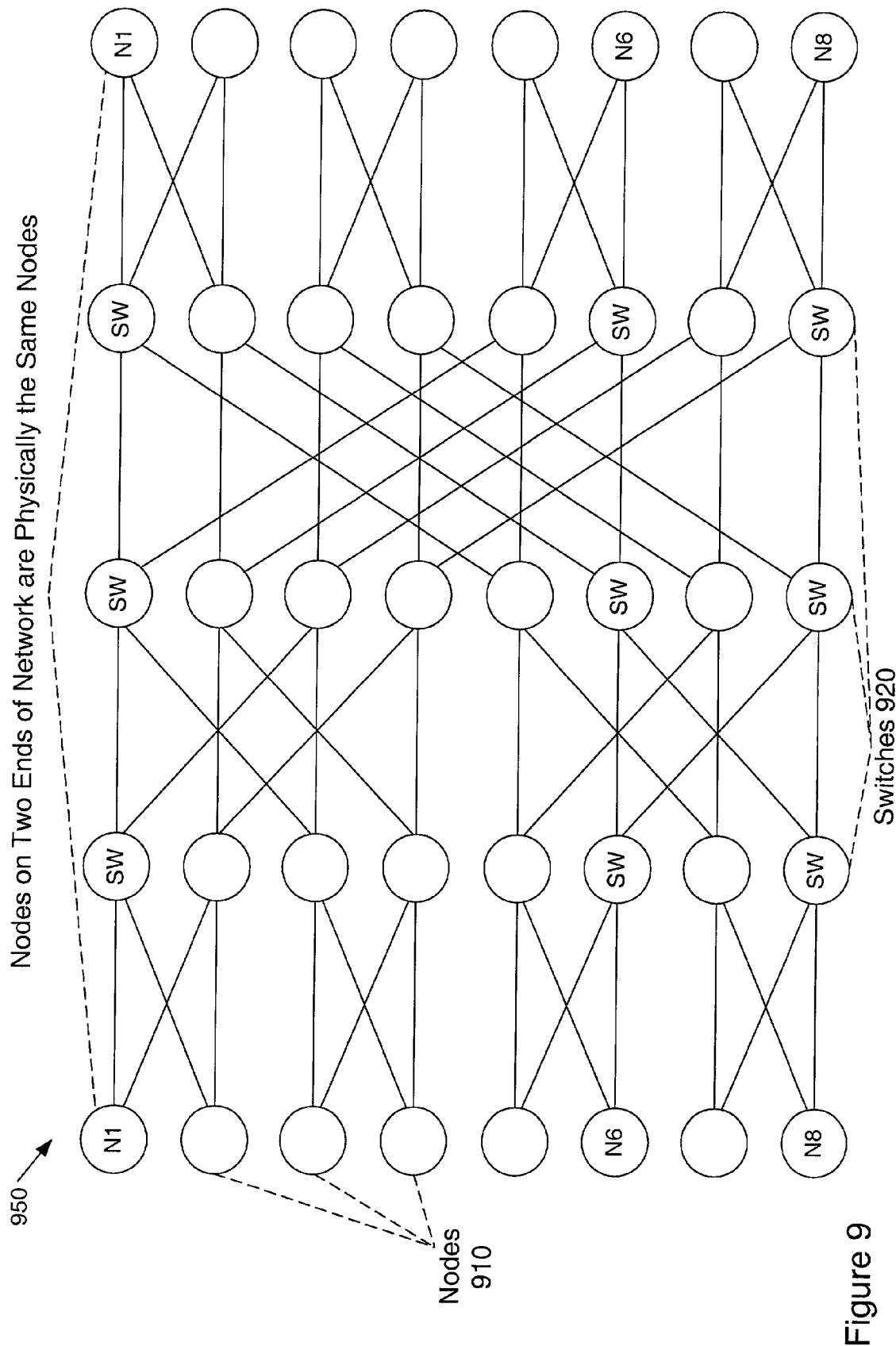
FIG. 9 is a diagram of one embodiment of a butterfly interconnection fabric.

Referring to FIG. 9, a diagram of an embodiment of a multiple path butterfly interconnection fabric is shown. A butterfly interconnection fabric 950 may be employed as the interconnection fabric depicted in FIG. 2. Butterfly interconnection fabric 950 includes nodes 910 and switches 920 which are interconnected via multiple communications paths. Similar to the interconnection fabric shown in FIG. 2 and the torus interconnection fabric of FIGS. 4A and 4B and the hypercubes of FIGS. 8A and 8B, nodes 910 and switches 920 of butterfly fabric 950 may communicate over multiple independent paths. Likewise, the nodes of butterfly 950 of FIG. 9 may also be configured to control or be connected to devices such as hard disks, cache memories, RAID controllers and host communications interfaces.

Butterfly interconnection fabric 950 may be referred to as a 2-path 8-node butterfly. In other embodiments, butterfly interconnection fabric 950 may be expanded into a Benes network (not shown), which is two back-to-back butterflies.

Additionally, the multiple paths of butterfly 950 of FIG. 9 may allow for multiple parallel communications and/or disk operations that may be initiated over different paths, thereby possibly increasing the bandwidth and performance of the storage system. In a butterfly storage system with multiple controllers/host attachments, many parallel paths may exist between the hosts and the disks. Thus, many disk operations may be issued at the same time and many data transfers may take place concurrently over the independent paths. This concurrency may provide a performance advantage and more scalability over bus-based architectures in which multiple devices must take turns using the same wires/fibre.

Figure 10:
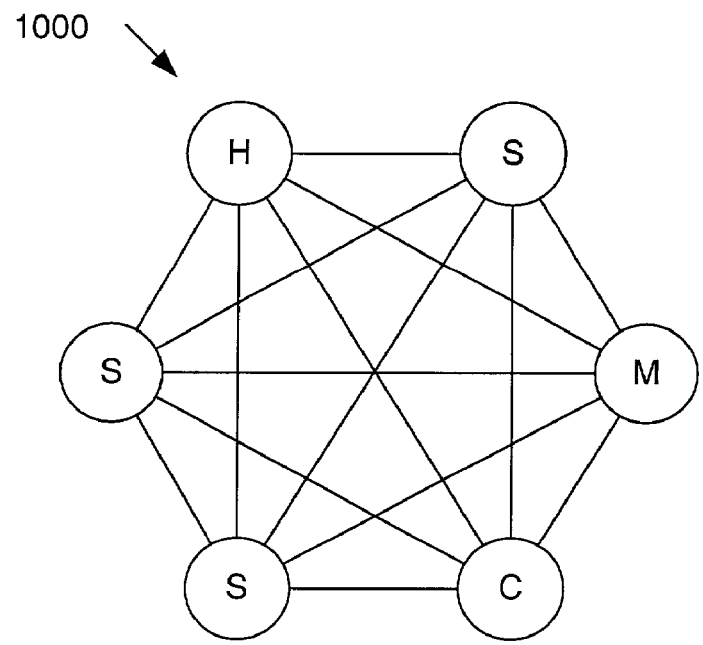
FIG. 10 is a diagram of one embodiment of a complete graph interconnection fabric.

Turning to FIG. 10, a diagram of one embodiment of a complete graph interconnection fabric is shown. A complete graph interconnection fabric 1000 may be employed as the interconnection fabric depicted in FIG. 2. In FIG. 10, complete graph interconnection fabric 1000 includes nodes coupled together by multiple independent communications paths. Similar to the interconnection fabrics described in the above figures, the nodes of complete graph interconnection fabric 1000 of FIG. 10 may also be configured to control or be connected to devices such as hard disks, cache memories, RAID controllers and host communications interfaces.

Figure 11:
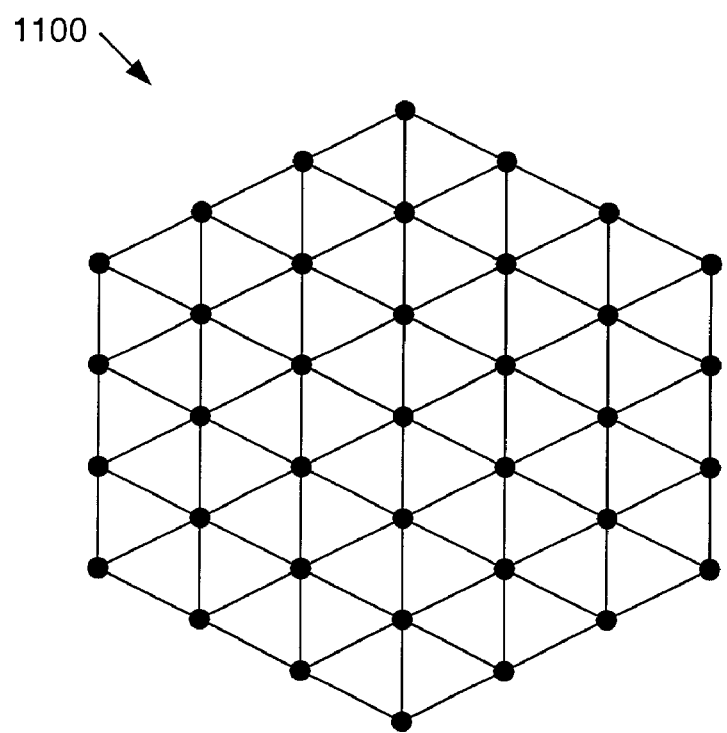
FIG. 11 is a diagram of one embodiment of a hex network interconnection fabric.

Referring to FIG. 11, a diagram of one embodiment of a hex network interconnection fabric is shown. A hex interconnection fabric 1100 may be employed as the interconnection fabric depicted in FIG. 2. In FIG. 11, hex interconnection fabric 1100 includes nodes interconnected by multiple independent communications paths. Similar to the interconnection fabrics described in the above figures, the nodes of hex interconnection fabric 1100 of FIG. 11 may also be configured to control or be connected to devices such as hard disks, cache memories, RAID controllers and host communications interfaces.

Figure 12:
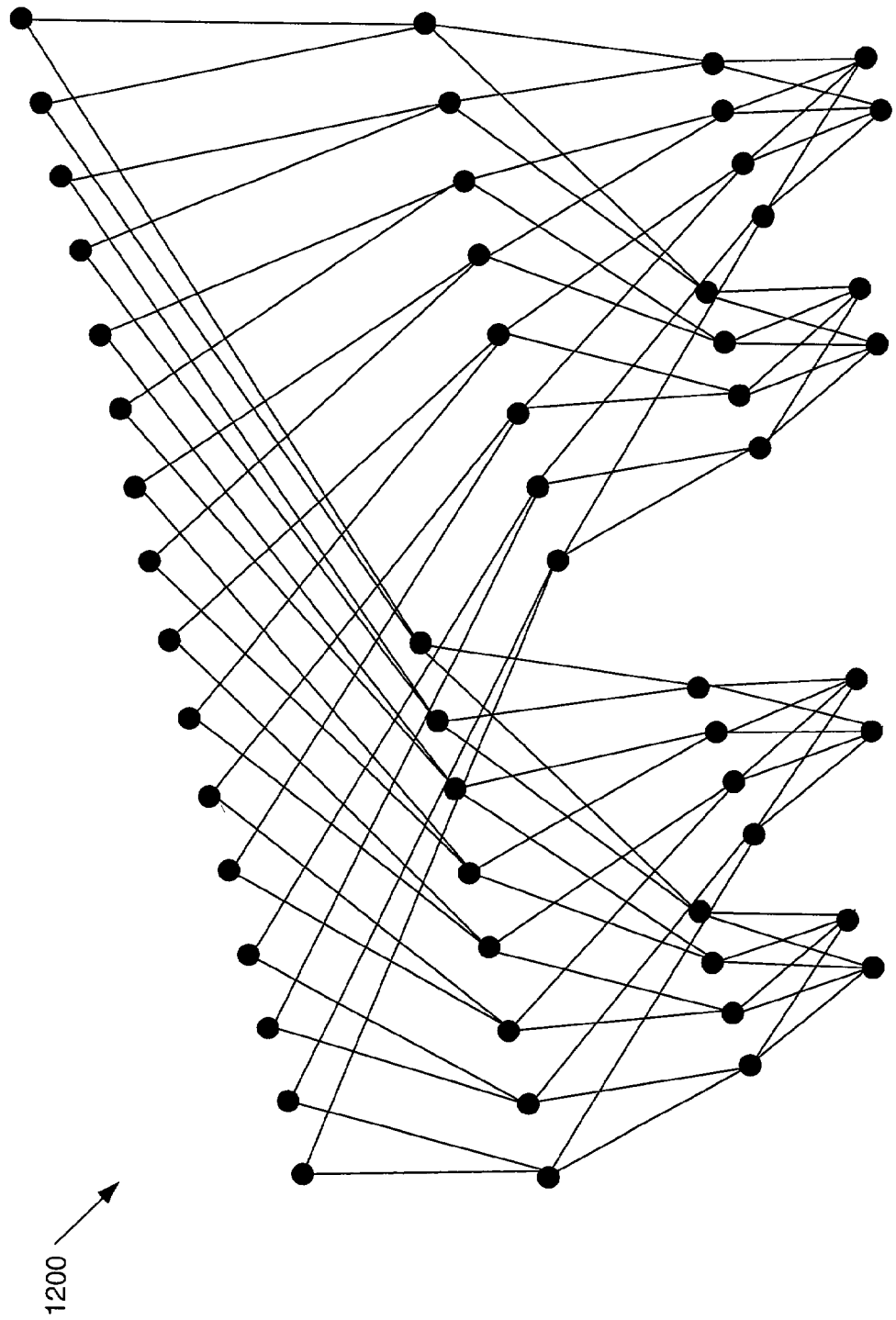
FIG. 12 is a diagram of one embodiment of a fat tree interconnection fabric.

Turning now to FIG. 12, a diagram of one embodiment of a fat tree interconnection fabric is shown. A fat tree interconnection fabric 1200 may be employed as the interconnection fabric depicted in FIG. 2. The fat tree interconnection fabric 1200 of FIG. 12 includes nodes interconnected by multiple independent communications paths. Similar to the interconnection fabrics described in the above figures, the nodes of fat tree interconnection fabric 1200 of FIG. 12 may also be configured to control or be connected to devices such as hard disks, cache memories, RAID controllers and host communications interfaces.

Additionally, the multiple paths of the interconnection fabrics described in FIGS. 10–12 may allow for multiple parallel communications and/or disk operations that may be initiated over different paths, thereby possibly increasing the bandwidth and performance of the storage system. In a storage system with multiple controllers/host attachments, such as those described above, many parallel paths may exist between the hosts and the disks. Thus, many disk operations may be issued at the same time and many data transfers may take place concurrently over the independent paths. This concurrency may provide a performance advantage and more scalability over bus-based architectures in which multiple devices must take turns using the same wires/fibre.

Figure 13:
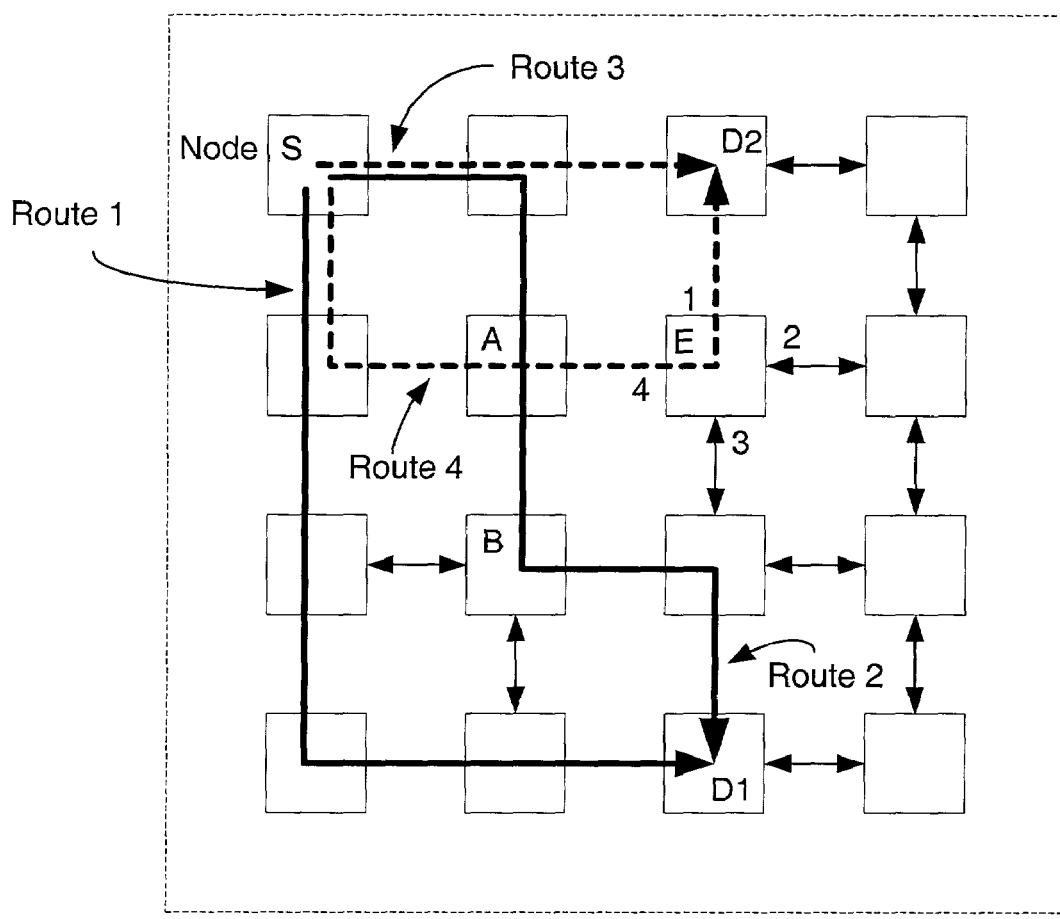
FIG. 13 shows a plurality of nodes connected in a two-dimensional mesh interconnection fabric and an example independent routes between a sending node and several destination nodes.

FIG. 13 provides an example of several routes that might be used for sending a message between a sending node S and destination node D1 and D2 in bi-directional mesh 1300. In bi-directional mesh 1300, each node may be configured to either receive messages from or send messages to its neighbors through each of its ports. Each node may have up to four ports 1–4, as shown by node E, which has numbered ports 1–4. In addition to the ports that connect each node to its neighboring nodes, each node may also have one or more ports that connect the node to a device (not shown). The sending node may be connected to a device such as a RAID controller. The sending device may maintain a routing table containing routing directives that describe paths between the sending node and one or more destination nodes in the interconnection fabric. In some embodiments, the sending node, not the sending device, may contain such a routing table. The destination node might be connected to a device such as a disk drive. In some embodiments, the destination node or device might maintain a routing table describing a return route back to the sending node. In other embodiments, neither the destination node nor the destination device may maintain such a return routing table. A return path may be supplied by the source node, calculated on-the-fly, or supplied by other means if necessary.

In FIG. 13, there are two independent routes, route 1 and route 2, shown between sending node S and destination node D1. Two independent routes, route 3 and route 4, are also shown between sending node S and destination node D2. Tables 1A and 1B illustrate two different routing tables that sending node S, or the device attached to sending node S, might maintain. In tables 1A and 1B, routes 1–4 from FIG. 13 are described by routing directives that may include variable numbers of segments. Each segment may have a distance component and a direction component. Generally, each distance component might describe a distance in the interconnection fabric while each direction component might specify a direction in the interconnection fabric. These routing directives might be used to send messages from sending node S to destination nodes D1 and D2.

TABLE 1A

Routing Table

| Destination | Segment 1 | Segment 2 | Segment 3 | Segment 4 |
|---|---|---|---|---|
| D1 (Route 1) | Three hops, Left | Two hops, Stop | | |
| D1 (Route 2) | One hop, Right | Two hops, Left | One hop, Right | One hop, Stop |
| D2 (Route 3) | Two hops, Stop | | | |
| D2 (Route 4) | One hop, Left | Two hops, Left | One hop, Stop | |

In Table 1A, the routing directive is composed of segments that each contain both a direction component and a distance component. While the maximum number of segments illustrated in Table 1A is four, other routing directives might contain more segments. In these particular embodiment, the direction components are specified as the relative directions "left, "right" or "go straight." Each segment of the routing directive might mean, "Go a certain distance, then turn a certain direction." Each node may select an output port on which to send the message based on the segment of the routing directive currently being executed. For example, in route 2, the distance component of the second segment is not complete until the message reaches node B, so node A may choose the output port that will continue to send the message in the same direction as it was traveling when node A received it. When the message reaches node B, the distance component of the second segment is complete. Node B may then use the direction component "left" to choose an output port that will send the message in the left of the direction in which the message was previously traveling. Since the second segment is now completely executed, the third segment of the routing directive becomes operative. The message may progress in this fashion until the final segment's distance component is complete. Then, the final direction component "stop" may tell node D1 that it is the destination node.

TABLE 1B

Routing Table

| Destination | Segment 1 | Segment 2 | Segment 3 | Segment 4 |
|---|---|---|---|---|
| D1 (Route 1) | Three hops, 2 | Two hops, Stop | | |
| D1 (Route 2) | One hop, 3 | Two hops, 2 | One hop, 3 | One hop, Stop |
| D2 (Route 3) | Two hops, Stop | | | |
| D2 (Route 4) | One hop, 2 | Two hops, 1 | One hop, Stop | |

Table 1B shows the same routing directives as Table 1A, except instead of using relative directions as direction components, these routing directives expressly specify port identifiers 1–4 as direction components. Using port identifiers as direction components might be especially useful in fabrics that are not readily described by relative directions. As with Table 1A, a message may be sent from node to node in the same direction until the current segment's distance component is complete. For example, when the message traveling along route 2 reaches node A, the distance component of segment two has completely executed. At this point, node A might look to the direction component of segment two and choose output port 2 as instructed. Now segment three becomes the current segment. The message may progress in this fashion until the final segment's distance component is complete.

Turning back to FIG. 3, typical node 300 will be further described. Node 300 may be configured to use the routing system of the present invention. Furthermore, node 300 may be configured to use one of the specific routing schemes disclosed in Tables 1A and 1B. If node 300 is a sending node, one of the devices interface controller 310 is configured to communicate with may be configured to create a message and/or to encode a routing directive in that message. Alternately, node 300 may itself be configured to encode a routing directive in the message. The message might contain header information, and the routing directive might be encoded as part of this header information. The routing directive might be selected from a routing table, and the routing table may list more than one routing directive for sending messages between the same pair of nodes. In an interconnection fabric where multiple paths exist between a pair of nodes, such as that shown in FIG. 2, a routing table might allow several alternate paths to be identified. By identifying more of the alternate paths, a routing table may enable a more robust routing system.

In some embodiments, node 300 might also encode a return routing directive in the message. Alternately, one of the devices configured to communicate with node 300 through interface controller 310 might encode the return routing directive in the message. Note that in some embodiments, some of the devices connected in the fabric may be more intelligent than others. For example, devices such as host computers and controllers may initiate all operations. Other devices, such as disk drives, may act as slave devices and lack any significant computing capability. As a result, the routing tables containing the routing directives, or the ability to calculate routing directives, may be concentrated in the more intelligent devices. If the destination device is one of the slave devices, it may be unable to respond to the sending device without a return routing directive. Thus a return routing directive provides a valuable description of how a destination node should send a reply to a communication from a sending node.

The return routing directive may already be stored in a routing table. Alternately, the return routing directive might be calculated in the sending node, or a device connected to the sending node, by reversing the routing directive being used to send the message. For example, reversing the routing directive describing route 2 in Table 1A might produce a return routing directive of "One hop, left; one hop, right; two hops, left; one hop, stop."

Figure 14:
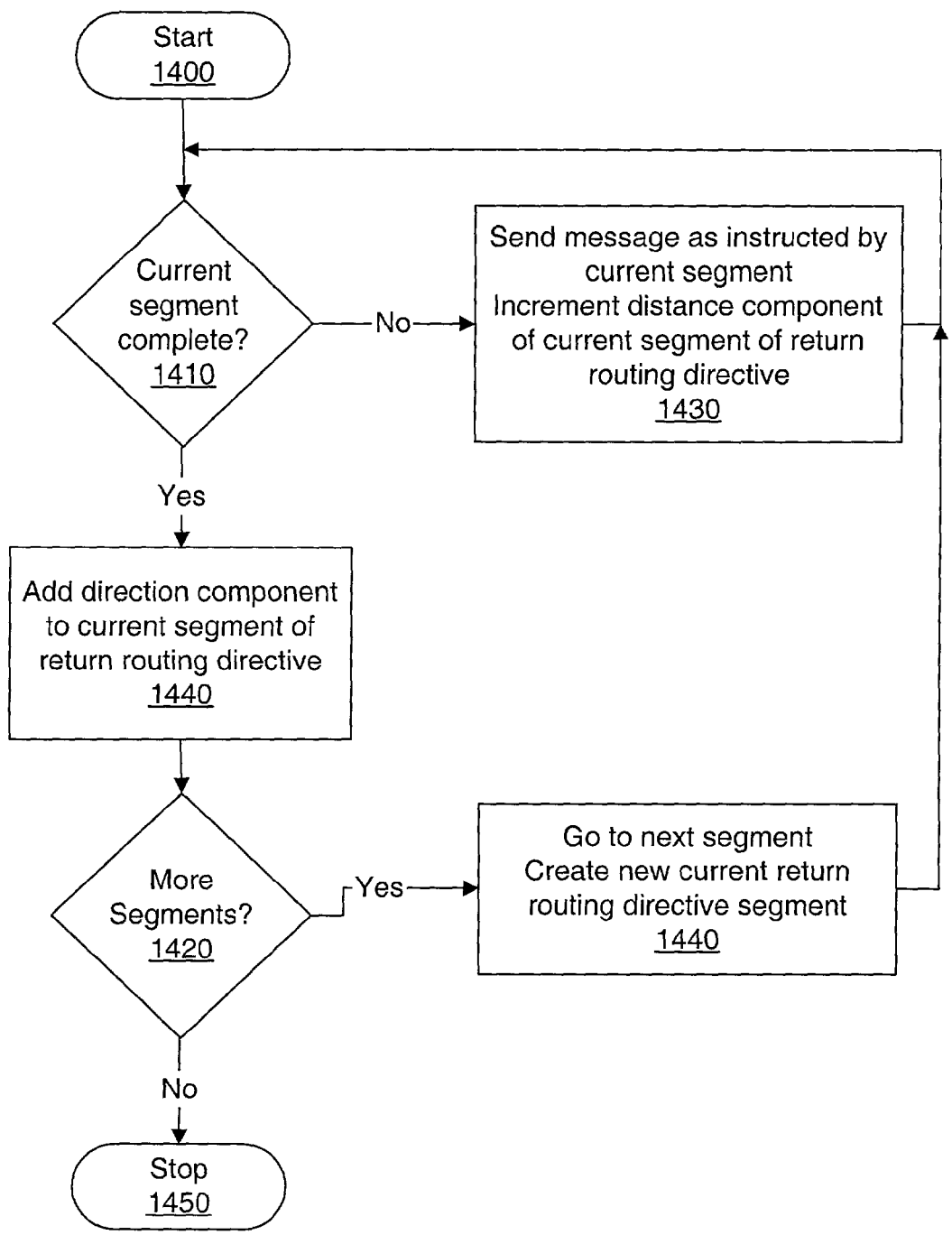
FIG. 14 is a flowchart of one embodiment of a method for incrementally creating a return routing directive.

Another alternative might involve creating the return routing directive incrementally. Thus, in some embodiments, nodes in the route might add information about the return route to the message incrementally. FIG. 14 illustrates one embodiment of the current invention that creates a return routing directive incrementally. In this embodiment, each node might add information to the return routing direction that is the opposite of the portion of the routing directive just completed. Thus, the sending node might encode the "stop" direction to the first return routing directive segment. Each subsequent node might then increment the distance component of a return routing directive segment as illustrated at step 1430. If a segment of the routing directive was completed at a particular node, that node might then add a return direction component equal to the direction opposite the one the sending route just completed as indicated at 1415. If the routing directive was still not complete, the node might create a new current return routing directive segment as well, as shown at 1440. This incremental process may create a useable return route when a message is received successfully. In cases where a fault is encountered along the route, the partial return routing directive may provide both a routing directive for sending an error message to the sending node and a means of pinpointing where the fault occurred.

Figure 15:
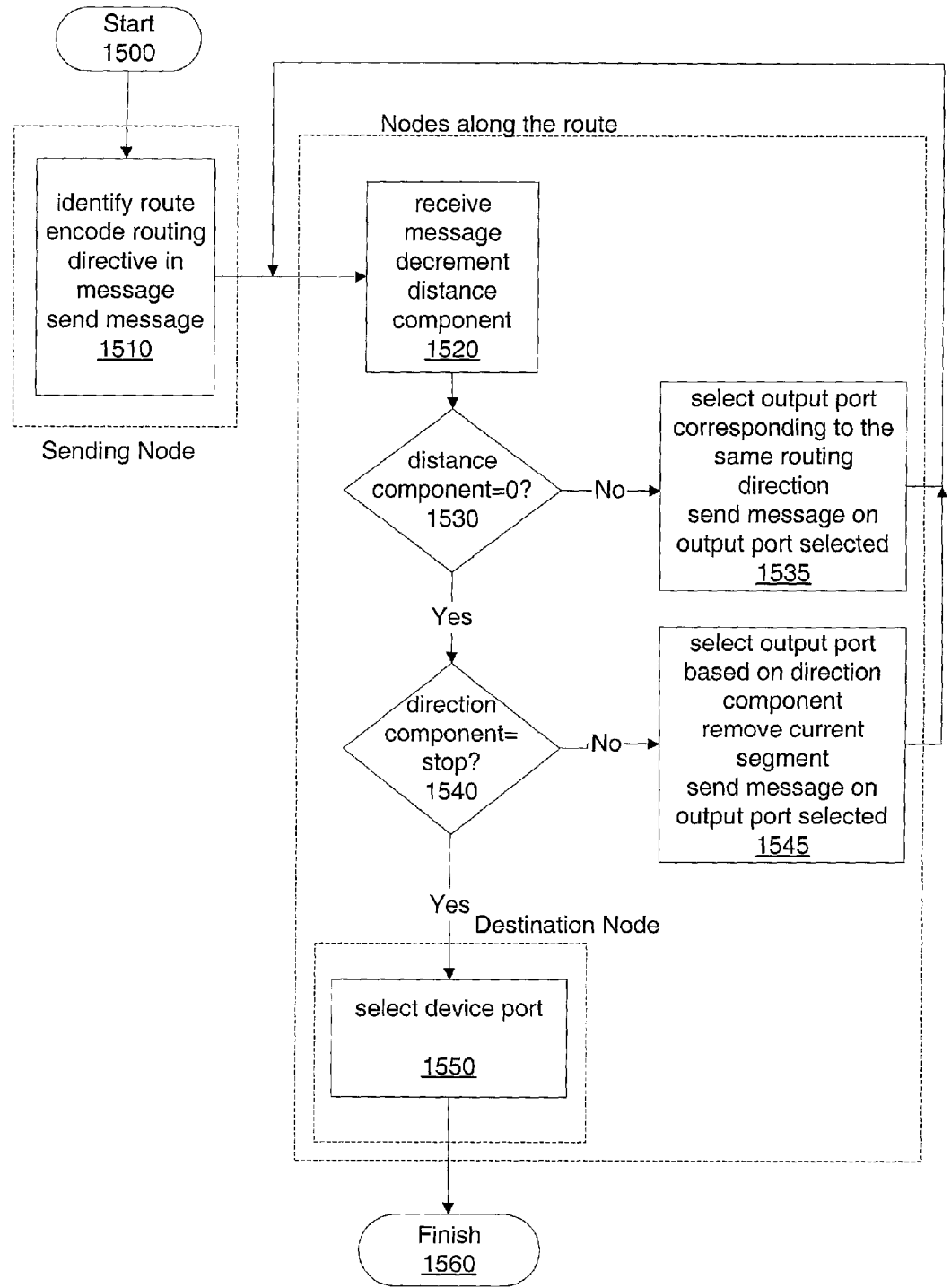
FIG. 15 is a flowchart describing one embodiment of a method of passing messages in an interconnection fabric using a routing directive.

FIG. 15 is a flowchart illustrating a routing system according to one embodiment. In step 1510, the sending node might identify the route, encode a routing directive describing that route in the message, and send the message on one of its output ports. In step 1520, a node might then receive the message on one of its input ports. The node may decrement the distance component in the current segment of the routing directive because a hop has been completed. The node may also check to see if the distance component equals zero in step 1530. In step 1535, if the distance component does not equal zero, the node may select an output port corresponding to the routing direction the message was traveling in when the node received it. If the distance component does equal zero, the node may check the direction component to see if it equals "stop" in step 1540. If the direction component does not equal "stop," the node may choose an output port based on the direction component and, now that the current segment has been completed, remove that segment from the routing directive so that the next segment becomes the current segment, as indicated at 1545. When the direction component equals "stop," the node is the destination node and, as indicated at 1550, might select an output path connected to a device into which to sink the message. It should be noted that other embodiments might be used to implement the routing system.

While nodes in this example actually remove segments from the message as they are completed, it is noted that other methods exist to indicate that a segment has been completed. For example, the route might include a pointer to indicate which segment is currently being executed. When a segment is completed, a node might move this pointer to the next segment in the route. Furthermore, the method of tracking the number of hops remaining in each segment might be executed in several ways. For example, the distance component might be encoded as a binary number, and each node might use a subtractor circuit to decrement this number. Alternately, the distance component might be encoded as a number of tick marks. Each node might then use shifting circuitry to remove a tick mark. A node might also modify the distance component by moving a pointer.

Figure 16:
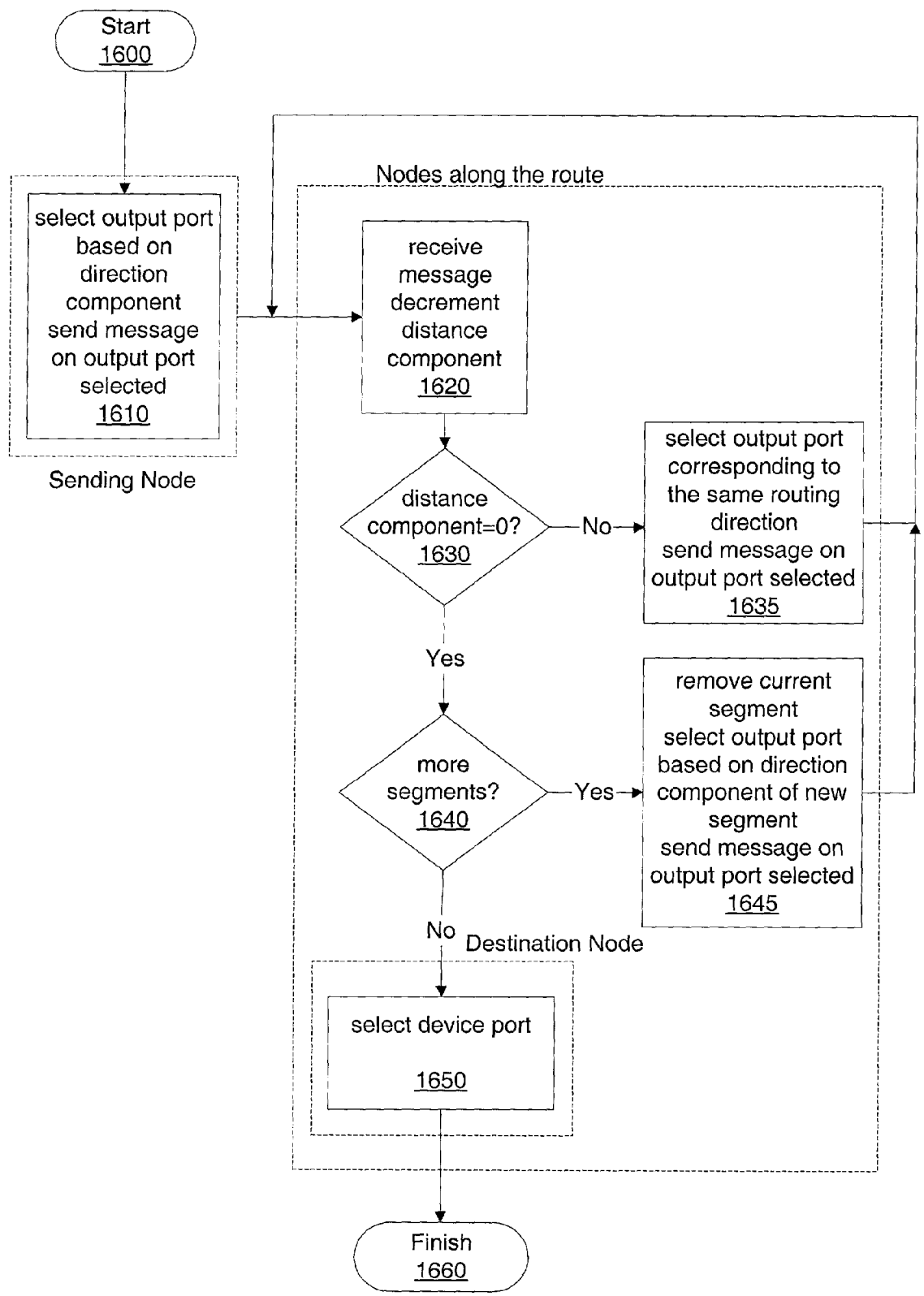
FIG. 16 shows a second embodiment of a method of sending messages using routing directives.

Note that specific encoding scheme used might also differ. While the routing directives in these examples do not instruct the sending node as to which of its output port should be selected, other embodiments might do so. FIG. 16 is a flowchart of such an embodiment. In this variation of the encoding scheme, each segment means, "Turn a certain direction, then go a certain distance." Furthermore, while the routing directives shown in Tables 1A and 1B indicated the final segment in each routing directive by a special value of the direction component, this routing scheme might represent the end of the routing directive by simply having no more segments. A node might recognize that it is the destination node when it receives a message that has a fully executed routing directive.

In step 1600, the sending node receives a message from a sending device configured to communicate with the sending node. Either the sending node or the sending device may encode the routing directive in the message. In step 1610, the sending node may look to the routing directive, select an output port based on the direction component of the first segment and send the message on that output port. Subsequent nodes may receive the message and decrement the distance component in step 1620. If the distance component does not equal zero, the node might send the message in the same routing direction as it was traveling. If the distance component does equal zero, the current segment may be complete. The node may check to see if there are more segments in step 1640. If not, the node might identify itself as the destination node and select a device port into which to sink the message. If there are more segments, the node may remove the current segment. For example, the node might remove a segment by moving a pointer to the next segment. Then, the node may use the direction component of the new segment to select an output port and send the message on that port.

Figure 17:
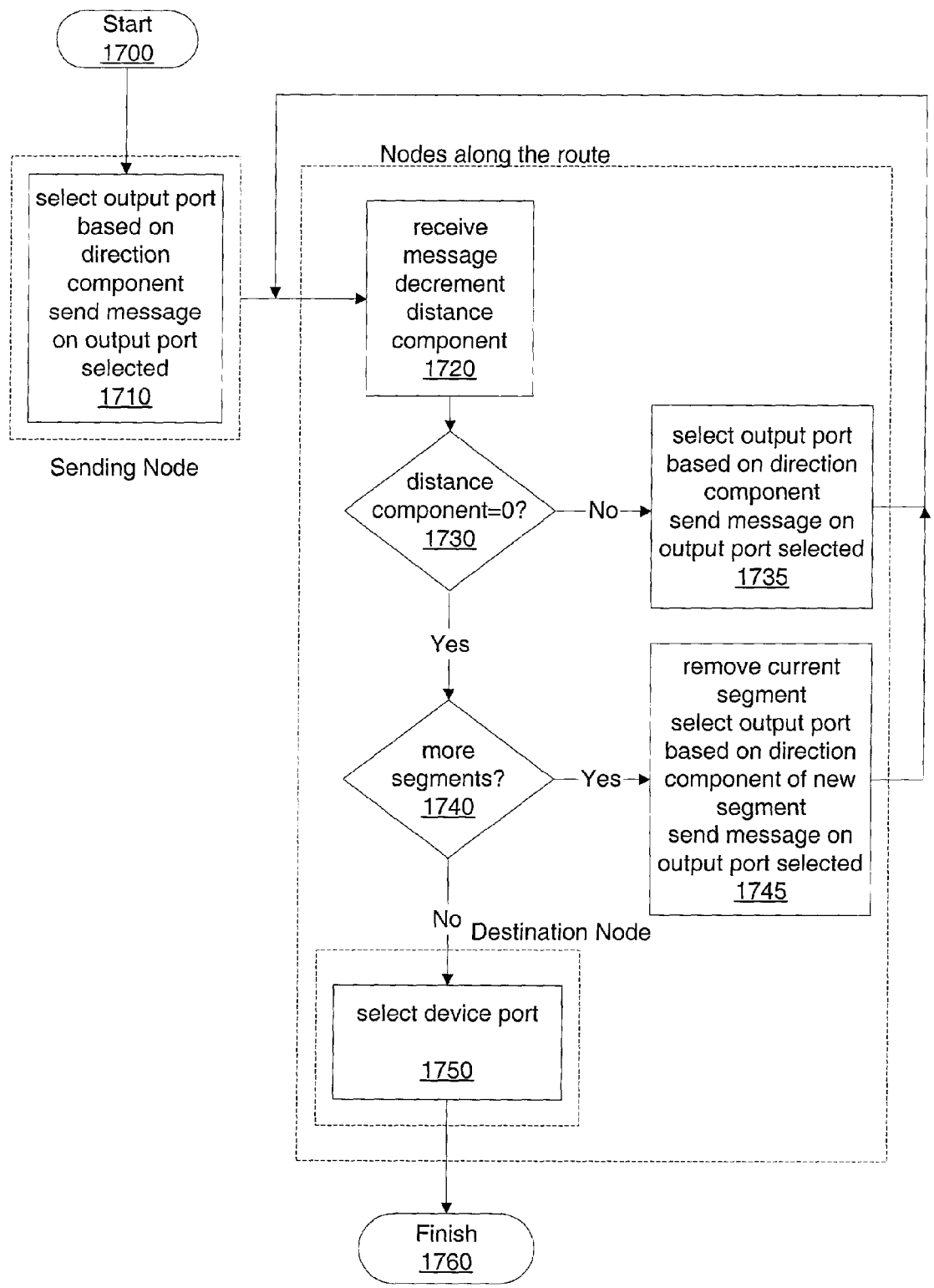
FIG. 17 shows a third embodiment of a method of sending messages using routing directives.

Alternately, instead of only using the direction component to select an output port when the distance component is complete, each node along the route might always use the direction component to select an output port. The flowchart in FIG. 17 illustrates this alternative. Here, a routing directive might mean, "Go a certain distance, using a certain port." In step 1735, the node might use the direction component, not the routing direction in which the message was traveling, to select an output port. In all other steps, the message might be routed as it was in FIG. 16.

Figure 18:
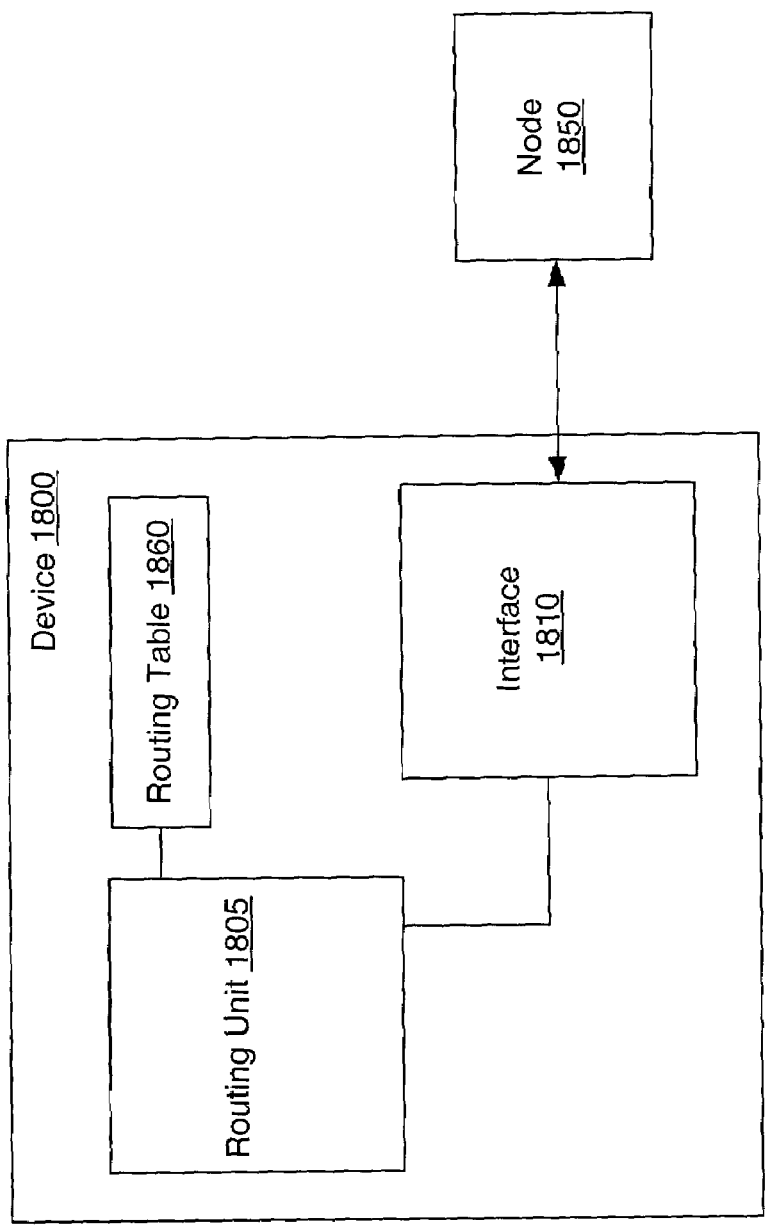
FIG. 18 shows a device configured according to some embodiments.

As discussed above, the routing directives may be provided by a device attached to the source node. FIG. 18 illustrates a device 1800 that provides the routing directive for messages to be sent to destination devices at destination nodes. The device 1800 has an interface configured to communicate with a source node in an interconnection fabric. The device 1800 also has a controller 1805, which may be configured to maintain a routing table 1860. Alternately, the controller may calculate routes as needed instead of maintaining a routing table. The controller may also control other functional units of the device, such as a disk drive. In other embodiments, the controller may include a RAID controller. Alternately, the controller 1805 may include functionality for a host interface or a line card configured to communicate with a host computer. The controller 1805 may be configured to provide a routing directive describing a route in the interconnection fabric so that messages can be sent from the node 1850 (source) to another node (destination) in the interconnection fabric. The routing directive includes at least one segment, and each segment includes a distance component and a direction component. The distance component is configured to be decremented at each node along the route. The controller 1805 may be configured to encode the first routing directive in a message, and to communicate the message to the node 1850 to be sent onto the interconnect fabric.

Numerous variations and modifications will become apparent to those skilled in the art once the above disclosure is fully appreciated. For example, even though node identifiers are not necessary for routing messages in this system, they might nonetheless be included for other purposes. It is intended that the following claims be interpreted to embrace all such variations and modifications.

What is claimed is:

1. A method of sending messages in an interconnection fabric, wherein the interconnection fabric couples together a plurality of nodes, wherein each node of the plurality of nodes comprises a plurality of input ports and a plurality of output ports, comprising:

for each of a plurality of messages:
dynamically selecting a route in the interconnection fabric from among a plurality of independent routes for sending the message from a sending node to a destination node, wherein said dynamically selecting a route comprises identifying a routing directive for the selected one of the plurality of independent routes from the sending node to the destination node;
wherein said dynamically selecting a route comprises selecting different ones of the independent routes from the sending node to the destination node for at least two of the messages;
encoding the routing directive in the message, wherein the routing directive describes the route and comprises at least one segment, wherein each segment comprises a direction component and a distance component;
sending the message on one of the output ports of the sending node;
receiving the message on one of the input ports of a first node connected to the output port of the sending node;
decrementing the distance component for a current segment of the routing directive;
selecting one of the output ports of the first node according to the current segment of the routing directive in the message; and
sending the message on the selected one of the output ports of the first node.

2. The method as recited in claim 1, wherein said selecting one of the output ports comprises:
if, after said decrementing, the distance component for the current segment is greater than zero, selecting the output port corresponding to a same routing direction in which the message was traveling when received; and
if, after said decrementing, the distance component for the current segment is zero, selecting the output port corresponding to the direction component of the current segment.

3. The method as recited in claim 2, wherein if, after said decrementing, the distance component for the current segment is zero, and the output port is selected according to the direction component of the current segment, the method further comprises removing the current segment from the routing directive so that a next segment becomes the current segment when the message is sent on the selected output port.

4. The method as recited in claim 3, wherein the routing directive further comprises a pointer to the current segment, and wherein said removing the current segment comprises moving the pointer to the next segment.

5. The method as recited in claim 1, further comprising:
a subsequent node receiving the message;
the subsequent node decrementing the distance component for the current segment of the routing directive;
wherein after said decrementing:
if the distance component for the current segment is greater than zero, the subsequent node selecting the output port corresponding to a same routing direction in which the message was traveling when received; and
if the distance component for the current segment is zero, the subsequent node selecting a port corresponding to the direction component of the current segment.

6. The method as recited in claim 5, wherein the subsequent node selecting a port corresponding to the direction component comprises:
selecting the corresponding output port if the direction component for the current segment specifies a routing direction; and
selecting a device port if the direction component for the current segment specifies that the subsequent node is the destination for the message.

7. The method as recited in claim 1 wherein the interconnection fabric is a torus interconnection fabric.

8. The method as recited in claim 1, further comprising:
identifying a return route from the destination node to the sending node; and
encoding a return routing directive in the message, wherein the return routing directive describes the return route and comprises at least one segment, wherein each segment comprises a direction component and a distance component.

9. The method as recited in claim 8, further comprising calculating the return routing directive.

10. The method as recited in claim 9, wherein the interconnection fabric is bi-directional, and wherein calculating the return routing directive comprises reversing the routing directive.

11. The method as recited in claim 1, further comprising incrementally encoding a return routing directive in the message, wherein the return routing directive describes a return route from the destination node to the sending node and comprises at least one segment, and wherein each segment comprises a direction component and a distance component.

12. The method as recited in claim 11, wherein incrementally encoding comprises:
incrementing the distance component for a current segment of the return routing directive;
wherein if, after said decrementing, the distance component for the current segment of the routing directive is zero, the method further comprises modifying the direction component of a current segment of the return routing directive and adding a new segment to the return routing directive so that the new segment becomes the current segment of the return routing directive when the message is sent on the selected output port.

13. The method as recited in claim 12, wherein the return routing directive further comprises a pointer to the current segment, wherein adding a new segment to the return routing directive further comprises moving the pointer to the new segment.

14. The method as recited in claim 1 wherein a first number of segments of a first routing directive differs from a second number of segments of a second routing directive.

15. The method as recited in claim 3 further comprising a subsequent node receiving the message and, if all of the segments of the routing directive have been removed, the subsequent node identifying itself as the destination node and selecting a device port.

16. The method as recited in claim 1, wherein each direction component comprises a direction relative to a routing direction the message was traveling in when received.

17. The method as recited in claim 1, wherein each direction component comprises an identifier of one of the output ports of one of the nodes.

18. The method as recited in claim 1, wherein the destination node is configured to communicate with a storage device.

19. The method as recited in claim 18, wherein the storage device comprises a disk drive.

20. A node, comprising:
a routing unit;
a plurality of input ports; and
a plurality of output ports;
wherein the node is configured to be connected to an interconnection fabric, wherein the interconnection fabric is configured to connect the node to a plurality of nodes;
wherein the routing unit is configured to receive a message being sent along a route from a sending node to a destination node in the interconnection fabric;
wherein the routing unit is further configured to receive a routing directive encoded in the message, wherein the routing directive describes the route and comprises at least one segment, and wherein a segment comprises a direction component and a distance component;
wherein the node is configured to receive the message on one of the input ports when the node is not the sending node, wherein the node is further configured to decrement the distance component of a current segment of the routing directive and to select one of the output ports according to the current segment;
wherein, when the node is the sending node, the node is further configured to dynamically select a route from among a plurality of independent routes from the sending node to the destination node and wherein the node is configured to encode the routing directive for the dynamically selected route in a message and wherein the node is configured to send the message on one of the output ports;
wherein for at least two messages, the node is further configured to dynamically select different ones of the independent routes from the sending node to the destination node when the node is the sending node.

21. The node as recited in claim 20, wherein the node is configured to communicate with a device on a device port, wherein the device is configured to select a route, encode a routing directive in the message and communicate a message to the node on the device port when the node is the sending node.

22. The node as recited in claim 21, wherein the node is further configured to select one of the output ports according to the current segment.

23. The node as recited in claim 20, wherein the node is configured to select:
one of the output ports corresponding to a same routing direction in which the message was traveling when received if, after said decrementing, the distance component for the current segment is greater than zero; and
one of the output ports corresponding to the direction component of the current segment if, after said decrementing, the distance component for the current segment is zero.

24. The node as recited in claim 23, wherein the node is further configured to remove the current segment from the routing directive if, after said decrementing, the distance component for the current segment is zero, and the wherein the node is configured to select the output port according to the direction component of the current segment, so that a next segment becomes the current segment when the message is sent on the selected output port.

25. The node as recited in claim 24, wherein the routing directive further comprises a pointer to the current segment, and wherein said being configured to remove the current segment comprises being configured to move the pointer to the next segment.

26. The node as recited in claim 20, wherein the node is configure to select:
one of the output ports corresponding to a same routing direction in which the message was traveling when received if, after said decrementing, the distance component for the current segment is greater than zero;
one of the output ports corresponding to the direction component of the current segment if, after said decrementing, the distance component for the current segment is zero, and if the direction component for the current segment does not identify that the node is the destination node; and
a device port if, after said decrementing, the distance component for the current segment is zero and if the direction component for the current segment identifies that the node is the destination node.

27. The node as recited in claim 20, wherein the interconnection fabric comprises a torus interconnection fabric.

28. The node as recited in claim 20, wherein, if the node is the sending node, the routing unit is further configured to identify a return route from the destination node to the sending node and to encode a return routing directive in the message, wherein the return routing directive describes the return route and comprises at least one segment, wherein each segment comprises a direction component and a distance component.

29. The node as recited in claim 28, wherein, if the node is the sending node, the routing unit is further configured to calculate the return routing directive.

30. The node as recited in claim 29, wherein the interconnection fabric is bi-directional, and wherein calculating the return routing directive comprises reversing the routing directive.

31. The node as recited in claim 20, wherein the node is configured to communicate with a RAID controller.

32. The node as recited in claim 20, wherein the node is configured to communicate with a mass storage device.

33. The node as recited in claim 32, wherein the mass storage device is a disk drive.

34. A device, comprising:
an interface configured to communicate with a source node in an interconnection fabric, wherein the interconnection fabric comprises a plurality of routes between the source node and a destination node; and
a controller configured to provide a first routing directive describing a first route from the source node to the destination node, wherein the routing directive comprises at least one segment, wherein each segment comprises a distance component and a direction component, wherein the distance component is configured to be decremented by a receiving node;
wherein the controller is further configured to encode the first routing directive in a message, and to communicate the message to the source node to be sent on the interconnection fabric to the destination node; and wherein the controller is further configured to maintain a routing table comprising a plurality of independent routes from the source node to the destination node, and wherein the controller is further configured to dynamically select the first routing directive from the routing table when communicating the message to the source node to be sent on the interconnection fabric to the destination node.

35. The device of claim 34, wherein said controller comprises a RAID controller.

36. The device of claim 34, wherein the controller comprises a host interface configured to communicate with a host computer.

37. The device of claim 34, wherein the controller comprises a disk storage device controller.

38. The device of claim 34, wherein the routing table further comprises a second routing directive describing a second route from the source node to the destination node.

39. The device of claim 38, wherein the second routing directive comprises a different number of segments than the first routing directive.

40. The device of claim 34, wherein the controller is further configured to calculate the first routing directive.

41. The device of claim 34, wherein the controller is further configured to provide a return routing directive describing a return route from the destination node to the source node, and wherein the controller is further configured to encode the return routing directive in the message.

42. The device of claim 41, wherein the controller is further configured to select the return routing directive from a routing table.

43. The device of claim 41, wherein the controller is further configured to calculate the return routing directive from the first routing directive.

44. The device of claim 34, wherein the controller is further configured to encode a return routing directive describing a return route from the destination node to the source node in the message, and wherein the return routing directive is configured to be incrementally added to as the message is routed to the destination node.

45. The device of claim 44, wherein the return routing directive is further configured to be used to return an error message to the source node if a routing error is encountered.

46. The device of claim 45, wherein the controller is further configured to use the incrementally created return routing directive to locate the routing error if an error message is returned, wherein the incrementally created return routing directive indicates a last node that successfully received the message.

47. A method of sending a message in an interconnection fabric, wherein the interconnection fabric couples together a plurality of nodes, wherein each node of the plurality of nodes comprises a plurality of input ports and a plurality of output ports, comprising:
    identifying a route in the interconnection fabric for sending the message from a sending node to a destination node;
    encoding a routing directive in the message, wherein the routing directive describes the route and comprises at least one segment, wherein each segment comprises a direction component and a distance component;
    identifying a return route from the destination node to the sending node;
    encoding a return routing directive in the message, wherein the return routing directive describes the return route and comprises at least one segment, wherein each segment comprises a direction component and a distance component;
    sending the message on one of the output ports of the sending node, wherein the message includes both the routing directive and the return routing directive when sent from the initial sending node;
    receiving the message on one of the input ports of a first node connected to the output port of the sending node;
    decrementing the distance component for a current segment of the routing directive;
    selecting one of the output ports of the first node according to the current segment of the routing directive in the message; and
    sending the message on the selected one of the output ports of the first node.

48. The method as recited in claim 47, further comprising calculating the return routing directive.

49. The method as recited in claim 48, wherein the interconnection fabric is bi-directional, and wherein calculating the return routing directive comprises reversing the routing directive.

50. A node, comprising:
    a routing unit;
    a plurality of input ports; and
    a plurality of output ports;
    wherein the node is configured to be connected to an interconnection fabric, wherein the interconnection fabric is configured to connect the node to a plurality of nodes;
    wherein the routing unit is configured to receive a message being sent along a route from a sending node to a destination node in the interconnection fabric;
    wherein the routing unit is further configured to receive a routing directive encoded in the message, wherein the routing directive describes the route and comprises at least one segment, and wherein a segment comprises a direction component and a distance component;
    wherein the node is configured to receive the message on one of the input ports when the node is not the sending node, wherein the node is further configured to decrement the distance component of a current segment of the routing directive and to select one of the output ports according to the current segment; and
    wherein, when the node is the sending node, the routing unit is further configured to identify a return route from the destination node to the sending node and to encode a return routing directive in the message, wherein the return routing directive describes the return route and comprises at least one segment, wherein each segment comprises a direction component and a distance component, wherein the message includes both the routing directive and the return routing directive when sent from the initial sending node.

51. The node as recited in claim 50, wherein, when the node is the sending node, the routing unit is further configured to calculate the return routing directive.

52. The node as recited in claim 51, wherein the interconnection fabric is bi-directional, and wherein calculating the return routing directive comprises reversing the routing directive.

53. A device, comprising:
    an interface configured to communicate with a source node in an interconnection fabric, wherein the interconnection fabric comprises a plurality of routes between the source node and a destination node; and a controller configured to provide a first routing directive describing a first route from the source node to the destination node, wherein the routing directive comprises at least one segment, wherein each segment comprises a distance component and a direction component, wherein the distance component is configured to be decremented by a receiving node;

wherein the controller is further configured to encode the first routing directive in a message, and to communicate the message to the source node to be sent on the interconnection fabric to the destination node; and wherein the controller is further configured to provide a return routing directive describing a return route from the destination node to the source node, wherein the return routing directive comprises at least one segment, wherein each segment comprises a direction component and a distance component; and wherein the controller is further configured to encode the return routing directive in the message, wherein the message includes both the routing directive and the return routing directive when sent from the initial sending node.

54. The device of claim 53, wherein the controller is further configured to select the return routing directive from a routing table.

55. The device of claim 53, wherein the controller is further configured to calculate the return routing directive from the first routing directive.

56. The device of claim 53, wherein the return routing directive is further configured to be used to return an error message to the source node if a routing error is encountered.

57. A method of sending a message in an interconnection fabric, wherein the interconnection fabric couples together a plurality of nodes, wherein each node of the plurality of nodes comprises a plurality of input ports and a plurality of output ports, comprising:
   identifying a route in the interconnection fabric for sending the message from a sending node to a destination node;
   encoding a routing directive in the message, wherein the routing directive describes the route and comprises at least one segment, wherein each segment comprises a direction component and a distance component;
   sending the message on one of the output ports of the sending node;
   receiving the message on one of the input ports of a first node connected to the output port of the sending node;
   decrementing the distance component for a current segment of the routing directive;
   selecting one of the output ports of the first node according to the current segment of the routing directive in the message;
   sending the message on the selected one of the output ports of the first node; and
   incrementally encoding a return routing directive in the message, wherein the return routing directive describes a return route from the destination node to the sending node and comprises at least one segment, and wherein each segment comprises a direction component and a distance component;
   wherein said incrementally encoding comprises:
      incrementing the distance component for a current segment of the return routing directive;
      wherein if, after said decrementing, the distance component for the current segment of the routing directive is zero, the method further comprises modifying the direction component of a current segment of the return routing directive and adding a new segment to the return routing directive so that the new segment becomes the current segment of the return routing directive when the message is sent on the selected output port.

58. The method as recited in claim 57, wherein the return routing directive further comprises a pointer to the current segment, wherein adding a new segment to the return routing directive further comprises moving the pointer to the new segment.

59. A node, comprising:
   a routing unit;
   a plurality of input ports; and
   a plurality of output ports;
   wherein the node is configured to be connected to an interconnection fabric, wherein the interconnection fabric is configured to connect the node to a plurality of nodes;
   wherein the routing unit is configured to receive a message being sent along a route from a sending node to a destination node in the interconnection fabric;
   wherein the routing unit is further configured to receive a routing directive encoded in the message, wherein the routing directive describes the route and comprises at least one segment, and wherein a segment comprises a direction component and a distance component;
   wherein the node is configured to receive the message on one of the input ports when the node is not the sending node, wherein the node is further configured to decrement the distance component of a current segment of the routing directive and to select one of the output ports according to the current segment; and
   wherein the routing unit is further configured to incrementally encode a return routing directive in the message, wherein the return routing directive describes a return route from the destination node to the sending node and comprises at least one segment, and wherein each segment comprises a direction component and a distance component, wherein in incrementally encoding a return routing directive, the routing unit is further configured to:
   increment the distance component for a current segment of the return routing directive;
   wherein if, after said decrementing, the distance component for the current segment of the routing directive is zero, the routing unit is further configured modify the direction component of a current segment of the return routing directive and add a new segment to the return routing directive so that the new segment becomes the current segment of the return routing directive when the message is sent on the selected output port.

60. A device, comprising:
   an interface configured to communicate with a source node in an interconnection fabric, wherein the interconnection fabric comprises a plurality of routes between the source node and a destination node; and
   a controller configured to provide a first routing directive describing a first route from the source node to the destination node, wherein the routing directive comprises at least one segment, wherein each segment comprises a distance component and a direction component, wherein the distance component is configured to be decremented by a receiving node;
   wherein the controller is further configured to encode the first routing directive in a message, and to communicate the message to the source node to be sent on the interconnection fabric to the destination node; and wherein the controller is further configured to incrementally encode a return routing directive describing a return route from the destination node to the source node in the message, wherein the return routing directive describes a return route from the destination node to the sending node and comprises at least one segment, and wherein each segment comprises a direction component and a distance component, and wherein the return routing directive is configured to be incrementally added to as the message is routed to the destination node, wherein the return routing directive is further configured to be used to return an error message to the source node if a routing error is encountered.

61. The device of claim 60, wherein the controller is further configured to use the incrementally created return routing directive to locate the routing error if an error message is returned, wherein the incrementally created return routing directive indicates a last node that successfully received the message.

62. A storage system, comprising a plurality of nodes interconnected by an interconnection fabric;
   wherein different ones of said plurality of nodes perform different functions in the storage system;
   wherein each one of a first portion of said plurality of nodes is a storage node comprising at least one mass storage device;
   wherein each one of a second portion of said plurality of nodes is a host interface node configured to provide an interface for the storage system to a host computer;
   wherein each node of the plurality of nodes comprises:
      a routing unit;
      a plurality of input ports; and
      a plurality of output ports;
   wherein the routing unit of each node is configured to receive a message being sent along a route from a sending node to a destination node in the interconnection fabric;
   wherein the routing unit of each node is further configured to receive a routing directive encoded in the message, wherein the routing directive describes the route and comprises at least one segment, and wherein a segment comprises a direction component and a distance component; and
   wherein each node is configured to receive the message on one of the input ports when the node is not the sending node, wherein the node is further configured to decrement the distance component of a current segment of the routing directive and to select one of the output ports according to the current segment.

* * * * *